US012736783B2

(12) United States Patent
Chen et al.

(10) Patent No.: US 12,736,783 B2

(45) Date of Patent: Sep. 15, 2026

(54) OPTICAL LENS

(71) Applicant: JIANGXI LIANCHUANG ELECTRONIC CO., LTD., Nanchang (CN)

(72) Inventors: Weijian Chen, Nanchang (CN); Yuxuan Xu, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 163 days.

(21) Appl. No.: 18/833,517

(22) PCT Filed: Jan. 17, 2023

(86) PCT No.: PCT/CN2023/072573

§ 371 (c)(1), (2) Date: Jul. 26, 2024

(87) PCT Pub. No.: WO2023/143239

PCT Pub. Date: Aug. 3, 2023

(65) Prior Publication Data

US 2025/0147282 A1 May 8, 2025

(30) Foreign Application Priority Data

Jan. 27, 2022 (CN) ........................ 202210097074.6

(51) Int. Cl.

*G02B 13/00* (2006.01)
*G02B 9/62* (2006.01)
*G03B 9/02* (2021.01)

(52) U.S. Cl.

CPC .......... *G02B 13/0045* (2013.01); *G02B 9/62* (2013.01)

(58) Field of Classification Search

CPC .... G02B 13/0045; G02B 9/62; G02B 13/006; G02B 13/06; G02B 2003/0093; G03B 9/02

See application file for complete search history.

(56) References Cited

U.S. PATENT DOCUMENTS 9,372,325 B2 * 6/2016 Cho ......................... G02B 9/60
10,241,301 B2 * 3/2019 Hsueh ................ G02B 13/0045

(Continued)

FOREIGN PATENT DOCUMENTS

CN 103576294 A 2/2014
CN 106443969 A 2/2017

(Continued)

OTHER PUBLICATIONS

WIPO, International Search Report for PCT Application No. PCT/CN2023/072573, May 15, 2023.

(Continued)

*Primary Examiner* — Ahmed A Berhan

(74) *Attorney, Agent, or Firm* — Ming Jiang; OPENPTO US LLC

(57) ABSTRACT

An optical lens, along optical axis from object side to imaging plane, sequentially includes: a first lens (L1) having negative optical power, convex object-side surface (S1) and concave image-side surface; a second lens (L2) having positive optical power, concave object-side surface (S3) and convex image-side surface (S4); a stop (ST); a third lens (L3) having positive optical power, convex object-side surface (S5) and image-side surface (S6); a fourth lens (L4) having positive optical power, convex object-side surface (S7) and image-side surface (S8); a fifth lens (L5) having negative optical power, concave object-side surface (S9) and image-side surface (S10); and a sixth lens (L6) having (Continued)

positive optical power, convex object-side surface (S11) and concave image-side surface (S12). The fourth lens (L4) and fifth lens (L5) form a cemented lens. True image height IH corresponding to maximal field of view and effective focal length f satisfy:

$$0.6 < f / IH < 0.7.$$

10 Claims, 13 Drawing Sheets

(56) References Cited

U.S. PATENT DOCUMENTS

| | | | | |
|---|---|---|---|---|
| 11,125,971 | B2 | 9/2021 | Chen | |
| 11,703,666 | B2 * | 7/2023 | Hagiwara | G02B 13/0045 359/713 |
| 2015/0177491 | A1 | 6/2015 | Cho et al. | |
| 2016/0139366 | A1 | 5/2016 | Jung | |
| 2019/0064500 | A1 | 2/2019 | Tsuji | |
| 2020/0257078 | A1 * | 8/2020 | Chen | G02B 13/0045 |

FOREIGN PATENT DOCUMENTS

| | | | |
|---|---|---|---|
| CN | 109298513 | A | 2/2019 |
| CN | 110908088 | A | 3/2020 |
| CN | 111830672 | A | 10/2020 |
| CN | 112305715 | A | 2/2021 |
| CN | 113009674 | A | 6/2021 |
| CN | 113933973 | A | 1/2022 |
| JP | 2007017638 | A | 1/2007 |
| KR | 101480333 | B1 | 1/2015 |

OTHER PUBLICATIONS

CNIPA, First Office Action for CN Application No. 202210097074.6, Mar. 17, 2022.

CNIPA, Office Action issued for CN Application No. 202210097074.6, Apr. 1, 2022.

EPO, Search Report for EP Application No. 23746121.5, May 2, 2025.

KIPO, Office Action for KR Application No. 10-2024-7027261, Mar. 12, 2026.

* cited by examiner

OPTICAL LENS

CROSS-REFERENCE OF RELATED APPLICATION

This application claims priority to Chinese Patent Application No. 202210097074.6 filed Jan. 27, 2022, which is hereby incorporated by reference in its entirety.

TECHNICAL FIELD

The present disclosure relates to the technical field of imaging lens, and in particular to an optical lens.

BACKGROUND

In recent years, with the rapid development of the automatic driving assistance systems, image algorithms are upgrading. An automotive lens is a key component of the automatic driving assistance system to obtain external information, and it also needs to be upgraded to meet the requirements of the present stage.

At present, for obtaining information in a single direction, the conventional automatic driving assistance system generally depends on a long-focus lens and a wide-angle lens. Although the long-focus lens has a long focal length, it has a small field of view, and it is generally used to capture objects at a long-distance for observation. Although the wide-angle lens has a large field of view, it has a short focal length, and it is generally used to capture objects at a short-distance for observation. Therefore, there is a need to design an optical lens which integrates functions of the long-focus lens and the wide-angle lens, and has a large aperture, a large field of view and a high resolution, so as to replace multiple lenses each having a single function in the traditional automatic driving assistance system.

SUMMARY

Embodiments of the present disclosure provide an optical lens with a large aperture, a large field of view and a high resolution.

For this, the technical solutions of the present disclosure are provided as follows.

The embodiments of the present disclosure provide an optical lens including a total of six lenses. From an object side to an imaging plane along an optical axis of the optical lens, the optical lens sequentially includes: a first lens, a second lens, a stop, a third lens, a fourth lens, a fifth lens and a sixth lens. The first lens has a negative focal power, an object side surface of the first lens is convex, and an image side surface of the first lens is concave. The second lens with a positive focal power, and an object side surface of the second lens is concave, and an image side surface of the second lens is convex. The third lens with a positive focal power, both an object side surface and an image side surface of the third lens are convex. The fourth lens with a positive focal power, both an object side surface and an image side surface of the fourth lens are convex. The fifth lens with a negative focal power, both an object side surface and an image side surface of the fifth lens are concave. The sixth lens with a positive focal power, an object side surface of the sixth lens is convex, and an image side surface of the sixth lens is concave. The fourth lens and the fifth lens are cemented to form a cemented lens. An effective focal length f of the optical lens and a true image height IH corresponding to a maximum field of view meets an expression: $0.6<f/IH<0.7$. An effective aperture HD1 of the object side surface of the first lens corresponding to a half field of view of the optical lens and an effective aperture D1 of the object side surface of the first lens meet an expression: $0.55<HD1/D1<0.65$.

Further, the effective focal length f of the optical lens meets an expression: $5.0\text{ mm}<f<5.5\text{ mm}$.

Further, an f-number of the optical lens meets an expression: $1.4<FNO\leq 1.6$. Further, a chief ray angle CRA on the imaging plane at a full field of view of the optical lens meets an expression: $1°<CRA<10°$.

Further, the effective focal length f of the optical lens and a focal length f1 of the first lens meet an expression: $-1.55<f1/f<-1.35$. A radius of curvature R1 of the object side surface of the first lens, a radius of curvature R2 of the image side surface of the first lens, and a center thickness CT1 of the first lens meet an expression: $1.5<R1/(R2+CT1)<1.9$.

Further, the effective focal length f of the optical lens and a focal length f2 of the second lens meet an expression: $3.5<f2/f<9.0$. A radius of curvature R3 of the object side surface and a radius of curvature R4 of the image side surface of the second lens meet an expression: $0.90<R3/R4<1.95$. A center thickness CT2 of the second lens and a total track length TTL of the optical lens meet an expression: $0.19\leq CT2/TTL\leq 0.22$.

Further, the effective focal length f of the optical lens and a focal length f3 of the third lens meet an expression: $1.5<f3/f<2.5$. A radius of curvature R5 of the object side surface of the third lens and the focal length f3 of the third lens meet an expression: $0.85<R5/f3<1.15$. A center thickness CT3 of the third lens and a total track length TTL of the optical lens meet an expression: $0.16\leq CT3/TTL\leq 0.24$.

Further, the effective focal length f of the optical lens and a focal length f4 of the fourth lens meet an expression: $1.5<f4/f<2.5$.

Further, the effective focal length f of the optical lens and a focal length f5 of the fifth lens meet an expression: $-1.6<f5/f<-1.0$. A radius of curvature R7 of the object side surface of the fourth lens and a radius of curvature R10 of the image side surface of the fifth lens meet an expression: $0.90<R7/R10<1.65$.

Further, the effective focal length f of the optical lens and a focal length f6 of the sixth lens meet an expression: $2.0<f6/f<3.5$. A radius of curvature R11 of the object side surface and a radius of curvature R12 of the image side surface of the sixth lens meet an expression: $-1.9<(R11+R12)/(R11-R12)<-1.1$.

Different from the related art, the embodiments of the present disclosure have beneficial effects as follows: a large aperture, a large field of view and a high resolution are enabled by reasonably matching the lens shapes among the lenses and combining the refractive power of various lenses.

A part of additional aspects and advantages of the present disclosure are set forth in the following description, and a part thereof would become apparent from the following description, or be understood by practice of the present disclosure.

BRIEF DESCRIPTION OF THE DRAWINGS

The above-mentioned and/or additional aspects and advantages of the present disclosure will become apparent and well understood from the following description of the embodiments in conjunction with the drawings, in which.

Figure 1:
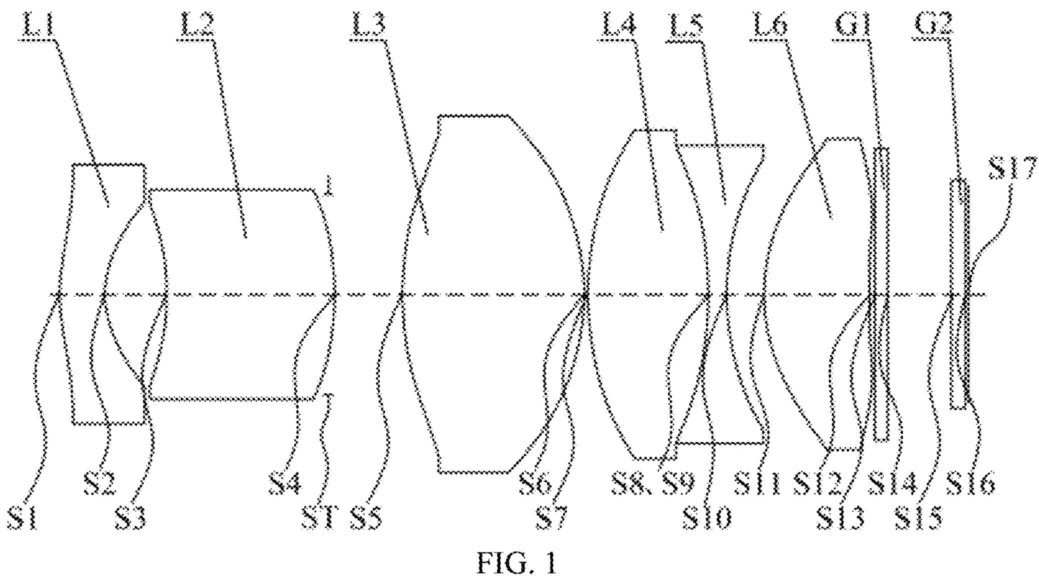
FIG. 1 is a schematic view illustrating a structure of an optical lens according to Embodiment 1 of the present disclosure.

The present disclosure will be further described by the following specific embodiments in combination with the accompanying drawings.

DETAILED DESCRIPTION OF PREFERRED EMBODIMENTS

In order to better understand the present disclosure, various aspects of the present disclosure will be described in more detail with reference to the accompanying drawings. It should be understood that these detailed descriptions are merely descriptions of the embodiments of the present disclosure, and are not intended to limit the scope of the present disclosure in any manner. Throughout the description, the same reference numbers refer to the same elements. The expression "and/or" includes any and all combinations of one or more of associated listed items.

It should be noted that, in the present disclosure, the expressions of first, second, third, etc. are merely used to distinguish one feature from another feature, without any limitation on the feature. Thus, a first lens discussed below may also be referred to as a second lens or a third lens without departing from the teachings of the present disclosure.

In the drawings, for convenience of illustration, the thickness, size, and shape of the lens are slightly exaggerated. Specifically, the shape(s) of spherical surface(s) or aspherical surface(s) shown in the drawings are exemplary. That is, the shape(s) of the spherical surface(s) or the aspheric surface(s) are not limited to those shown in the drawings. The drawings are merely exemplary and are not drawn to scale.

Herein, a paraxial region refers to a region near an optical axis. If a lens surface is convex and the convex position of the surface is not defined, it indicates that the lens surface is convex at least in the paraxial region. If a lens surface is concave and the concave position of the surface is not defined, it indicates that the lens surface is concave at least in the paraxial region. A surface of each lens closest to the to-be-captured object is referred to as an object side surface of the lens, and a surface of each lens closest to an imaging plane is referred to as an image side surface of the lens.

It should be noted that the embodiments of the present disclosure and features in the embodiments may be combined with each other without conflict. Hereinafter, the present disclosure will be described in detail with reference to the accompanying drawings and the embodiments.

An optical lens provided by the embodiments of the present disclosure includes sequentially from an object side to an imaging plane: a first lens, a second lens, a stop, a third lens, a fourth lens, a fifth lens, and a sixth lens.

In some embodiments, the first lens has a negative refractive power, and has a convex object side surface and a concave image side surface. Such refractive power and surfaces of the first lens are beneficial to collect light from a large field of view as much as possible into the following optical lenses. The first lens is aspheric surfaces, which is beneficial to obtain a large angular resolution at a central region of the optical lens, and improve the image resolution. The first lens is made of a material having a high refractive index, which is beneficial to reduce a front aperture of the optical lens and to improve the imaging quality.

In some embodiments, the second lens has a positive refractive power, and has a concave object side surface and a convex image side surface. Such refractive power and surfaces of the second lens are beneficial to collect the light incident from the first lens, make a travel path of the light have a smooth transition, reduce the front aperture of the optical lens, and reduce a volume of the optical lens, which is helpful in miniaturization of the optical lens and reduction of the cost.

In some embodiments, the stop is arranged between the second lens and the third lens, and the stop is configured to limit the beam of the light. This is beneficial to gather the light entering into the optical system, reduce the front aperture of the optical lens, and improve the imaging quality of the optical lens.

In some embodiments, the third lens has a positive refractive power, and has a convex object side surface and a convex image side surface. Such refractive power and surfaces of the third lens are beneficial to converge the light, and make the diverged light enter into the subsequent light path smoothly, that is, a smooth transition is provided in the travel path of the light.

In some embodiments, the fourth lens has a positive refractive power, and has a convex object side surface and a convex image side surface. Such refractive power and surfaces of the fourth lens are beneficial to converge the light, and make the diverged light enter into the subsequent light path smoothly, that is, a smooth transition is further provided in the travel path of the light.

In some embodiments, the fifth lens has a negative refractive power, and has a concave object side surface and a concave image side surface. Such refractive power and surfaces of the fifth lens can have a certain effect of correcting the aberration, and are beneficial to avoid the light from being too divergent in the subsequent light path.

In some embodiments, the image side surface of the fourth lens and the object side surface of the fifth lens may be cemented together. The fourth lens and the fifth lens form a cemented lens. This takes charge of the overall chromatic aberration correction of the optical system, and effectively corrects the aberration. It also alleviates problems of tolerance sensitivity such as tilting/off-of-center of the lenses caused during assembly, and improves the production yield.

In some embodiments, the sixth lens has a positive refractive power, and has a convex object side surface and a concave image side surface. Such refractive power and surfaces of the sixth lens are beneficial to effectively transmit more light to the imaging plane, correct the astigmatism and field curvature, and improve the resolving power of the optical lens. The sixth lens have aspherical surfaces, which is beneficial to the flatness of the surfaces, and can eliminate the aberration that occurs during imaging, thereby improving the imaging quality of the optical lens.

In some embodiments, an effective focal length f of the optical lens meets an expression: $5.0\ \text{mm}<f<5.5\ \text{mm}$. This helps to improve an ability of the lens in highlighting a subject and an ability in shooting a distant scene.

In some embodiments, an f-number of the optical lens meets an expression: $1.4<FNO\leq1.6$. This ensures an illuminance at an edge imaging region of the optical lens while having both a long focal length and a large field of view.

In some embodiments, a chief ray angle (CRA) on the imaging plane at a full field of view of the optical lens meets an expression: $1°<CRA<10°$. This can bring a large tolerance value between the CRA of the optical lens and a CRA of a chip sensor, and can also ensure the illuminance at an edge imaging region.

In some embodiments, the effective focal length f of the optical lens and a true image height IH corresponding to a maximum field of view meets an expression: $0.6<f/IH<0.7$. This can ensure that the optical lens has a large imaging surface, and meets an imaging requirement of a chip having a large target plane.

In some embodiments, an effective aperture HD1 of the object side surface of the first lens corresponding to a half field of view of the optical lens and an effective aperture D1 of the object side surface of the first lens meet an expression: $0.55<HD1/D1<0.65$. This can ensure that a central field of view of the optical lens is concentrated near the optical axis, enable coma and astigmatism to be reduced as much as possible, and also enable a great illumination of an edge field of view.

In some embodiments, the effective focal length f of the optical lens and a focal length f1 of the first lens meet an expression: $-1.55<f1/f<-1.35$. This enables the first lens to have a small negative refractive power, and is beneficial to collect the light from a large field of view as much as possible to enter into the following optical lenses.

In some embodiments, the effective focal length f of the optical lens and a focal length f2 of the second lens meet an expression: $3.5<f2/f<9.0$. This enables the second lens to have a large positive refractive power, which is beneficial to converge the light beam as much as possible so that more light enters into the following lenses, and improve the illumination intensity of the edge imaging region.

In some embodiments, the effective focal length f of the optical lens and a focal length f3 of the third lens meet an expression: $1.5<f3/f<2.5$. This enables the third lens to have a large positive refractive power, which is beneficial to converge the light beam as much as possible so that more light enters into the following lenses, and improve the illumination intensity of the edge imaging region.

In some embodiments, the effective focal length f of the optical lens and a focal length f4 of the fourth lens meet an expression: $1.5<f4/f<2.5$. This enables the fourth lens to have a small positive refractive power, which is beneficial to reduce aberrations caused by light emitted from the fourth lens.

In some embodiments, the effective focal length f of the optical lens and a focal length f5 of the fifth lens meet an expression: $-1.6<f5/f<-1.0$. This enables the fifth lens to have a small negative refractive power, which is beneficial to correct the aberration caused its previous lenses, and avoid the light from being too divergent in the subsequent light path.

In some embodiments, the effective focal length f of the optical lens and a focal length f6 of the sixth lens meet an expression: $2.0<f6/f<3.5$. This enables the sixth lens to have a large positive refractive power, which is beneficial to reduce decentering sensitivity of imaging by the light beam imaging, and correct the aberration of the optical lens to enable excellent imaging quality of the optical lens.

In some embodiments, a radius of curvature R1 of the object side surface of the first lens, a radius of curvature R2 of the image side surface of the first lens, and a center thickness CT1 of the first lens in the optical lens meet an expression: $1.5<R1/(R2+CT1)<1.9$. This is beneficial to increase the field of view, enable various aberrations generated by the first lens itself to be balanced, and improve the imaging quality of the optical lens.

In some embodiments, a radius of curvature R3 of the object side surface and a radius of curvature R4 of the image side surface of the second lens in the optical lens meet an expression: $0.90<R3/R4<1.95$. This is beneficial to make shapes of the object-side surface and the image side surface of the second lens be approximately concentric circles, balance the astigmatism generated by the first lens, and improve the imaging quality of the optical lens.

In some embodiments, a radius of curvature R5 of the object side surface of the third lens and the focal length f3 of the third lens in the optical lens meet an expression: $0.85<R5/f3<1.15$. This is beneficial to reduce a sensitivity of the third lens, balance various aberrations of the optical lens, and improve the imaging quality of the optical lens.

In some embodiments, a radius of curvature R7 of the object side surface of the fourth lens and a radius of curvature R10 of the image side surface of the fifth lens in the optical lens meet an expression: 0.90<R7/R10<1.65. This is beneficial to make shapes of the object side surface of the fourth lens and the image side surface of the fifth lens be approximately concentric circles, balance various aberrations generated by the fourth lens and the fifth lens, and improve the imaging quality of the optical lens.

In some embodiments, a radius of curvature R11 of the object side surface and a radius of curvature R12 of the image side surface of the sixth lens in the optical lens meet an expression: −1.9<(R11+R12)/(R11−R12)<−1.1. This enables the image side surface of the sixth lens to be flat, enables a distortion at an edge of the optical lens to be optimized, balances the field curvature of the optical lens, corrects astigmatism, and improves the imaging quality of the optical lens.

In some embodiments, a center thickness CT2 of the second lens and the total track length TTL of the optical lens meet an expression: 0.19≤CT2/TTL≤0.22. This is beneficial to correct the field curvature by the thick second lens.

In some embodiments, a center thickness CT3 of the third lens and the total track length TTL of the optical lens meet an expression: 0.16≤CT3/TTL≤0.24. This is beneficial to correct the field curvature by the thick third lens.

In some embodiments, a sum ECT of center thicknesses of all the lenses and the total track length TTL of the optical lens meet an expression: 0.65<ΣCT/TTL<0.75. This is beneficial to short the total length of the optical lens.

In order to make the optical system have good optical performances, multiple aspheric lenses are used in the optical lens, and a shape of each aspheric surface of the optical lens meets the following equation:

$$Z = \frac{ch^2}{1+\sqrt{1-(1+K)c^2h^2}} + Ah^2 + Bh^4 + Ch^6 + Dh^8 + Eh^{10} + Fh^{12}$$

where Z represents a distance between a position on the surface and a vertex of the surface along the optical axis, h represents a distance from the optical axis to the position on the surface, c represents the curvature of the vertex of the surface, K represents a quadratic surface coefficient, A represents a second-order surface coefficient, B represents a fourth-order surface coefficient, C represents a sixth-order surface coefficient, D represents an eighth-order surface coefficient, E represents a tenth-order surface coefficient, and F represents a twelfth-order surface coefficient.

The present disclosure will be further described below in several embodiments below. In the various embodiments, the thickness, the radius of curvature, and the material selection of each lens in the optical lens are different, which may refer to the parameter table of the respective embodiments. The following embodiments just illustrate preferred implementations of the present disclosure. However, the implementations of the present disclosure are not limited only by the following embodiments, and any other variations, substitutions, combinations or simplifications, that are made without departing from the concept of the present disclosure, should be regarded as equivalent implementations, and fall within the protection scope of the present disclosure.

Embodiment 1

Referring to FIG. 1, the structure of an optical lens provided in Embodiment 1 of the present disclosure is illustrated. From an object side to an imaging plane along an optical axis, the optical lens sequentially includes: a first lens L1, a second lens L2, a stop ST, a third lens L3, a fourth lens L4, a fifth lens L5, a sixth lens L6, a filter G1 and a protective glass G2.

The first lens L1 has a negative refractive power. The object side surface S1 of the first lens L1 is convex, and the image side surface S2 of the first lens is concave. The second lens L2 has a positive refractive power. The object side surface S3 of the second lens L2 is concave, and the image side surface S4 of the second lens L2 is convex. Then is the stop ST. The third lens L3 has a positive refractive power. Both the object side surface S5 and the image side surface S6 of the third lens L3 are convex. The fourth lens L4 has a positive refractive power. Both the object side surface S7 and the image side surface S8 of the fourth lens L4 are convex. The fifth lens L5 has a negative refractive power. Both the object side surface S9 and the image side surface S10 of the fifth lens L5 are concave. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 1 of the present disclosure are shown in Table 1-1.

TABLE 1-1

| Surface No. | | Surface type | Radius of curvature R (mm) | Thickness D/ Distance L(mm) | Refractive index Nd | Abbe number Vd |
|---|---|---|---|---|---|---|
| | Object plane | plane | Infinity | Infinity | | |
| S1 | First lens | Aspheric surface | 7.76 | 1.68 | 1.95 | 32.32 |
| S2 | | Aspheric surface | 3.39 | 2.32 | | |
| S3 | Second lens | Spherical surface | −9.59 | 6.29 | 2.05 | 26.94 |
| S4 | | Spherical surface | −10.06 | −0.23 | | |
| ST | Stop | plane | Infinity | 2.75 | | |
| S5 | Third lens | Spherical surface | 10.93 | 6.83 | 1.44 | 95.10 |
| S6 | | Spherical surface | −8.47 | 0.12 | | |
| S7 | Fourth lens Fifth lens | Spherical surface | 11.66 | 4.52 | 1.55 | 75.50 |

TABLE 1-1-continued

| Surface No. | | Surface type | Radius of curvature R (mm) | Thickness D/ Distance L(mm) | Refractive index Nd | Abbe number Vd |
|---|---|---|---|---|---|---|
| S8/S9 | | Spherical surface | −13.08 | 0.70 | 1.86 | 25.16 |
| S10 | | Spherical surface | 10.17 | 1.39 | | |
| S11 | Sixth lens | Aspheric surface | 6.78 | 4.02 | 1.59 | 68.62 |
| S12 | | Aspheric surface | 84.96 | 0.11 | | |
| S13 | Filter | Plane | Infinity | 0.50 | 1.52 | 64.20 |
| S14 | | Plane | Infinity | 2.39 | | |
| S15 | Protective | Plane | Infinity | 0.50 | 1.52 | 64.20 |
| S16 | glass | Plane | Infinity | 0.11 | | |
| S17 | Imaging plane | Plane | Infinity | | | |

The parameters of surfaces of the aspheric lenses in the optical lens provided in Embodiment 1 of the present disclosure are shown in Table 1-2.

TABLE 1-2

| Surface No. | K | A | B | C | D | E | F |
|---|---|---|---|---|---|---|---|
| S1 | −0.32 | 0.00E+00 | −2.88E−03 | 4.43E−06 | 4.11E−06 | −1.66E−07 | 2.19E−09 |
| S2 | −3.30 | 0.00E+00 | 3.94E−03 | −5.72E−04 | 6.27E−05 | −3.29E−06 | 7.30E−08 |
| S11 | −3.00 | 0.00E+00 | 6.79E−05 | −2.60E−06 | 4.55E−08 | −1.78E−09 | −9.31E−15 |
| S12 | −2.20 | 0.00E+00 | −3.84E−04 | 6.56E−06 | −1.48E−07 | 2.08E−09 | −3.08E−11 |

Figure 2:
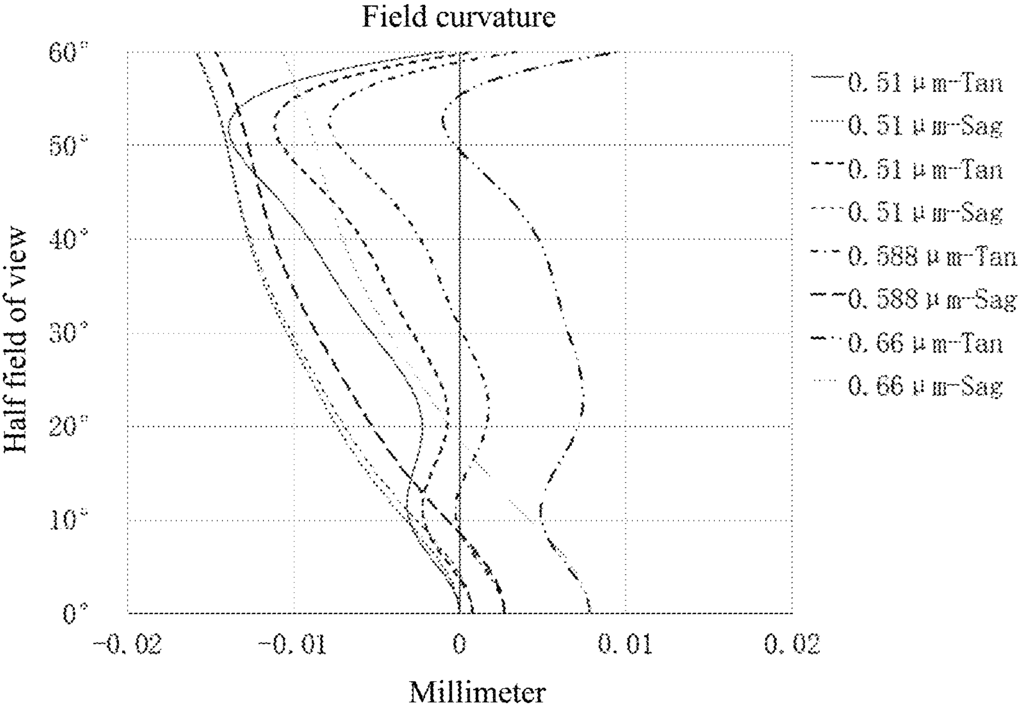
FIG. 2 is a graph of field curvatures of the optical lens according to Embodiment 1 of the present disclosure.
Figure 3:
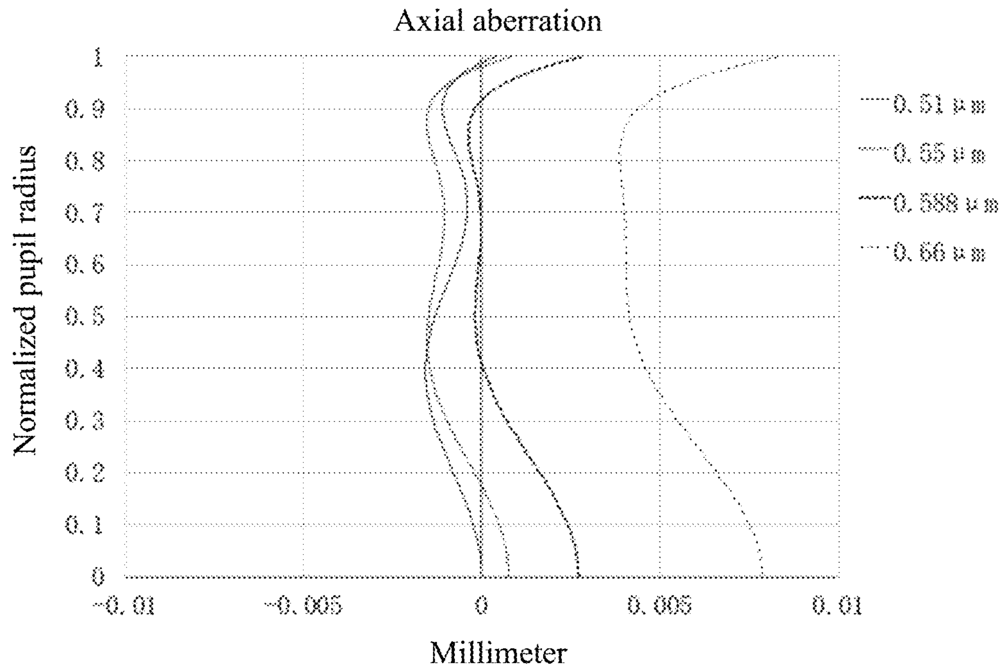
FIG. 3 is a graph of axial aberrations of the optical lens according to Embodiment 1 of the present disclosure.
Figure 4:
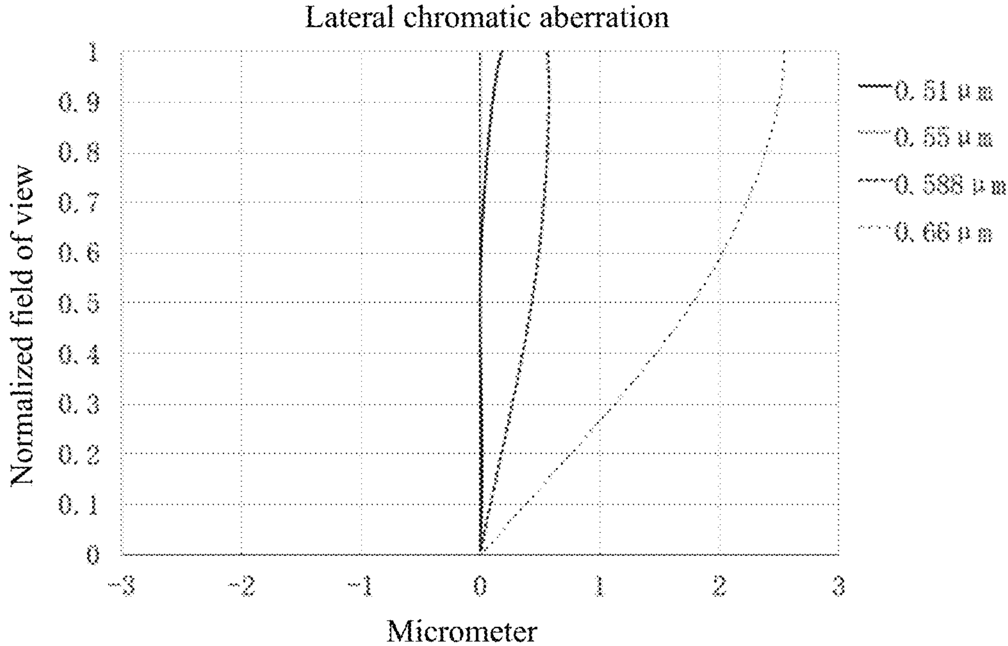
FIG. 4 is a graph of lateral chromatic aberrations of the optical lens according to Embodiment 1 of the present disclosure.
Figure 5:
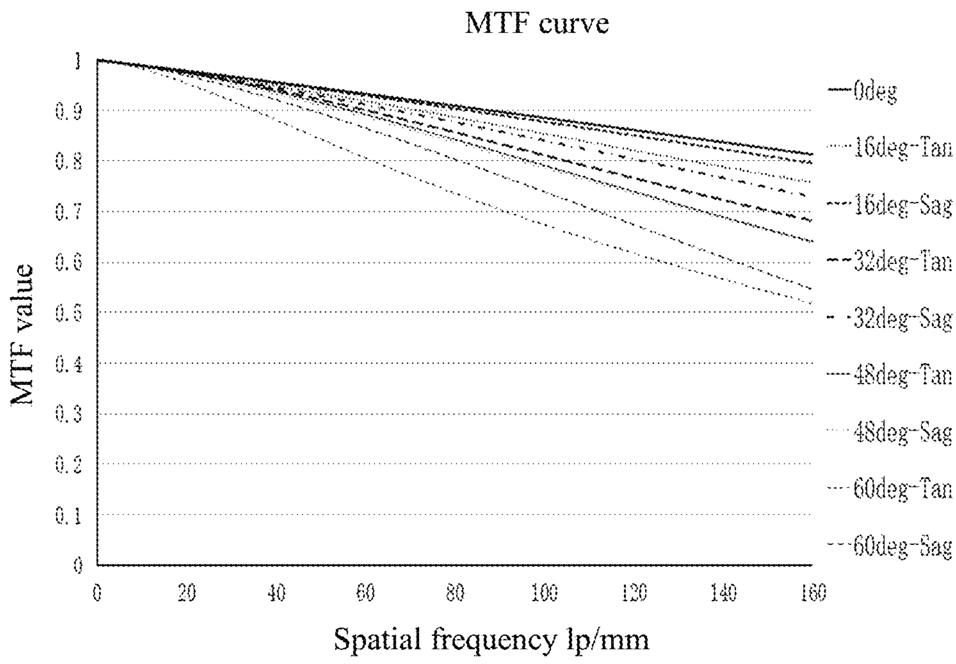
FIG. 5 is a graph of Modulation Transfer Function (MTF) of the optical lens according to Embodiment 1 of the present disclosure.

In the embodiment, the field curvature curves of the optical lens are shown in FIG. 2, the axial aberration curves of the optical lens are shown in FIG. 3, the lateral chromatic aberration curves of the optical lens are shown in FIG. 4, and the MTF curves of the optical lens are shown in FIG. 5.

The field curvature curves of Embodiment 1 are illustrated in FIG. 2, which represent curvature degrees of light at different wavelengths on a meridional plane and a sagittal plane. The horizontal axis represents an offset (unit: millimeter), and the vertical axis represents a half field of view (unit: degree (°)). It can be seen from the graph that the field curvatures of the meridional plane and the sagittal plane are within ±0.02 mm, which shows that the field curvatures of the optical lens are well corrected.

The axial aberration curves of Embodiment 1 are illustrated in FIG. 3, which represent aberrations on the optical axis at the imaging plane. The horizontal axis represents the axial aberration (unit: millimeter), and the vertical axis represents the normalized pupil radius. It can be seen from the graph that an offset of the axial aberration is within ±0.01 mm, which shows that optical lens can effectively correct the axial aberration thereof.

The lateral chromatic aberration curves of Embodiment 1 are illustrated in FIG. 4, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within ±3 μm, which shows that the optical lens can effectively correct the chromatic aberration of the edge field of view and the secondary spectrum of the entire imaging plane.

The MTF curves of Embodiment 1 are illustrated in FIG. 5, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-160) lp/mm, the MTF curves uniformly and smoothly decrease from the center to the edge field of view. A good imaging quality and a good detail resolution capability are all enabled at either a low frequency or a high frequency.

Embodiment 2

Figure 6:
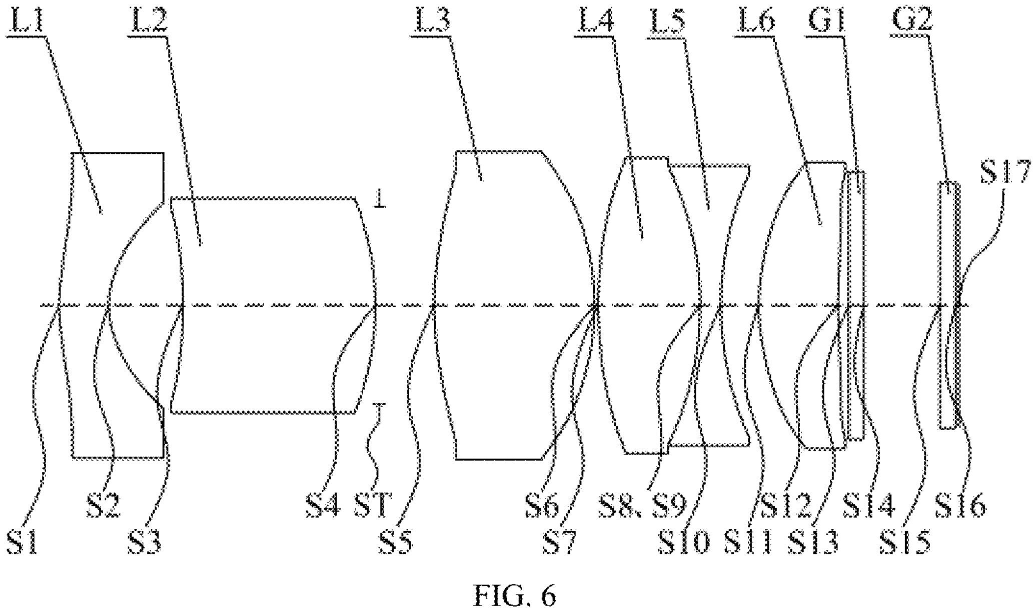
FIG. 6 is a schematic view illustrating a structure of an optical lens according to Embodiment 2 of the present disclosure.

Referring to FIG. 6, the structure of the optical lens provided in Embodiment 2 of the present disclosure is illustrated. From an object side to an imaging plane along an optical axis, the optical lens sequentially includes: a first lens L1, a second lens L2, a stop ST, a third lens L3, a fourth lens L4, a fifth lens L5, a sixth lens L6, a filter G1 and a protective glass G2.

The first lens L1 has a negative refractive power. The object side surface S1 of the first lens L1 is convex, and the image side surface S2 of the first lens is concave. The second lens L2 has a positive refractive power. The object side surface S3 of the second lens L2 is concave, and the image side surface S4 of the second lens L2 is convex. Then is the stop ST. The third lens L3 has a positive refractive power. Both the object side surface S5 and the image side surface S6 of the third lens L3 are convex. The fourth lens L4 has a positive refractive power. Both the object side surface S7 and the image side surface S8 of the fourth lens L4 are convex. The fifth lens L5 has a negative refractive power. Both the object side surface S9 and the image side surface S10 of the fifth lens L5 are concave. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 2 of the present disclosure are shown in Table 2-1.

TABLE 2-1

| Surface No. | | Surface type | Radius of curvature R (mm) | Thickness D/ Distance L(mm) | Refractive index Nd | Abbe number Vd |
|---|---|---|---|---|---|---|
| | Object plane | plane | Infinity | Infinity | | |
| S1 | First lens | Aspheric surface | 8.346 | 1.660 | 1.81 | 40.73 |
| S2 | | Aspheric surface | 3.076 | 2.500 | | |
| S3 | Second lens | Spherical surface | −14.023 | 6.504 | 1.83 | 37.23 |
| S4 | | Spherical surface | −9.252 | 0.134 | | |
| ST | Stop | plane | Infinity | 1.854 | | |
| S5 | Third lens | Spherical surface | 11.812 | 5.410 | 1.50 | 81.52 |
| S6 | | Spherical surface | −8.237 | 0.119 | | |
| S7 | Fourth lens Fifth lens | Spherical surface | 13.713 | 3.452 | 1.61 | 58.61 |
| S8/S9 | | Spherical surface | −10.677 | 0.697 | 1.85 | 23.79 |
| S10 | | Spherical surface | 10.636 | 1.280 | | |
| S11 | Sixth lens | Aspheric surface | 7.098 | 2.755 | 1.59 | 68.62 |
| S12 | | Aspheric surface | 25.624 | 0.280 | | |
| S13 | Filter | Plane | Infinity | 0.500 | 1.52 | 64.20 |
| S14 | | Plane | Infinity | 2.599 | | |
| S15 | Protective | Plane | Infinity | 0.500 | 1.52 | 64.20 |
| S16 | glass | Plane | Infinity | 0.113 | | |
| S17 | Imaging plane | Plane | Infinity | | | |

The parameters of surfaces of the aspheric lenses in the optical lens provided in Embodiment 2 of the present disclosure are shown in Table 2-2.

TABLE 2-2

| Surface No. | K | A | B | C | D | E | F |
|---|---|---|---|---|---|---|---|
| S1 | −5.48 | 0.00E+00 | −1.88E−03 | 1.12E−05 | 2.53E−06 | −1.02E−07 | 1.32E−09 |
| S2 | −2.89 | 0.00E+00 | 5.64E−03 | −5.95E−04 | 6.25E−05 | −3.17E−06 | 7.19E−08 |
| S11 | −21.26 | 0.00E+00 | 1.25E−05 | −9.00E−05 | 4.46E−06 | −1.48E−07 | 1.99E−09 |
| S12 | −1.62 | 0.00E+00 | −4.38E−04 | 1.04E−05 | −3.95E−07 | 6.41E−09 | −1.35E−10 |

Figure 7:
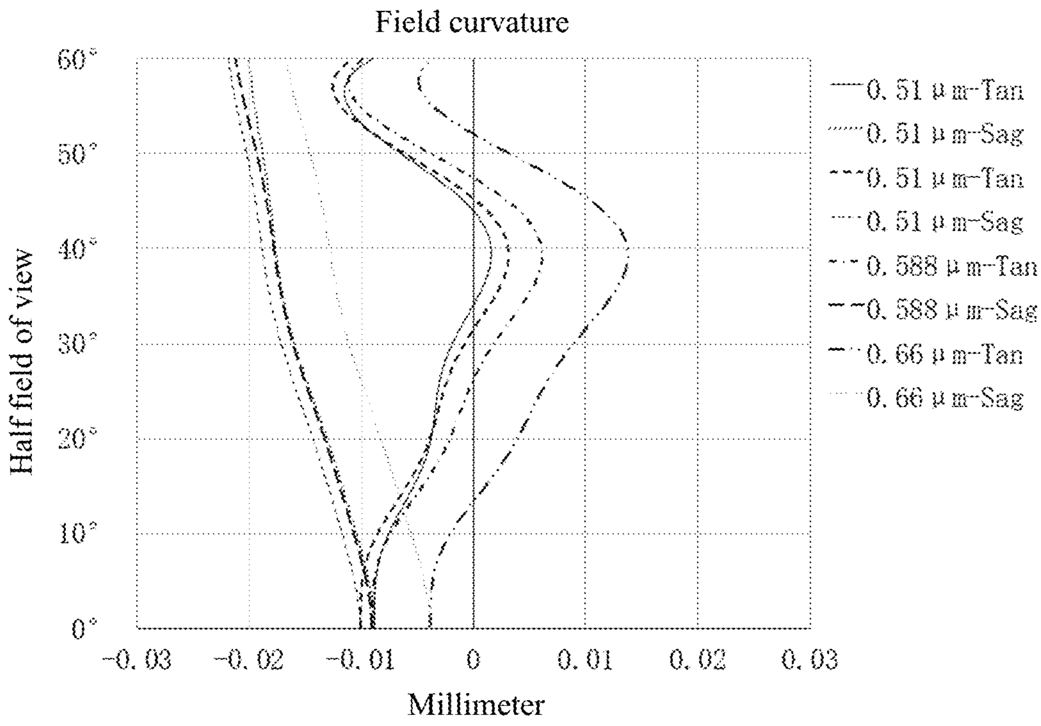
FIG. 7 is a graph of field curvatures of the optical lens according to Embodiment 2 of the present disclosure.
Figure 8:
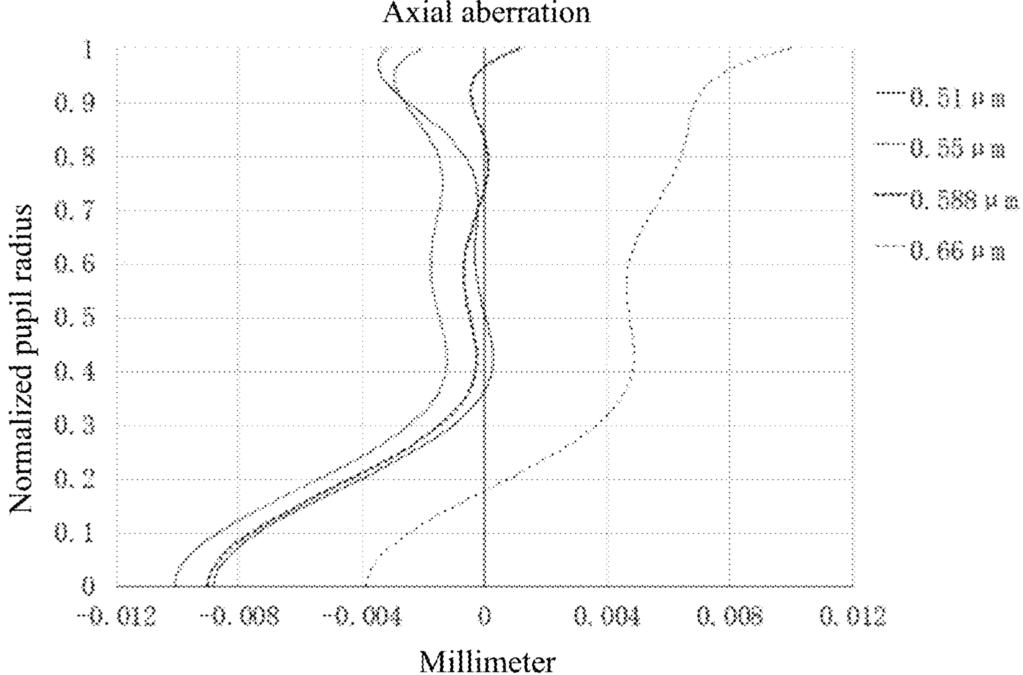
FIG. 8 is a graph of axial aberrations of the optical lens according to Embodiment 2 of the present disclosure.
Figure 9:
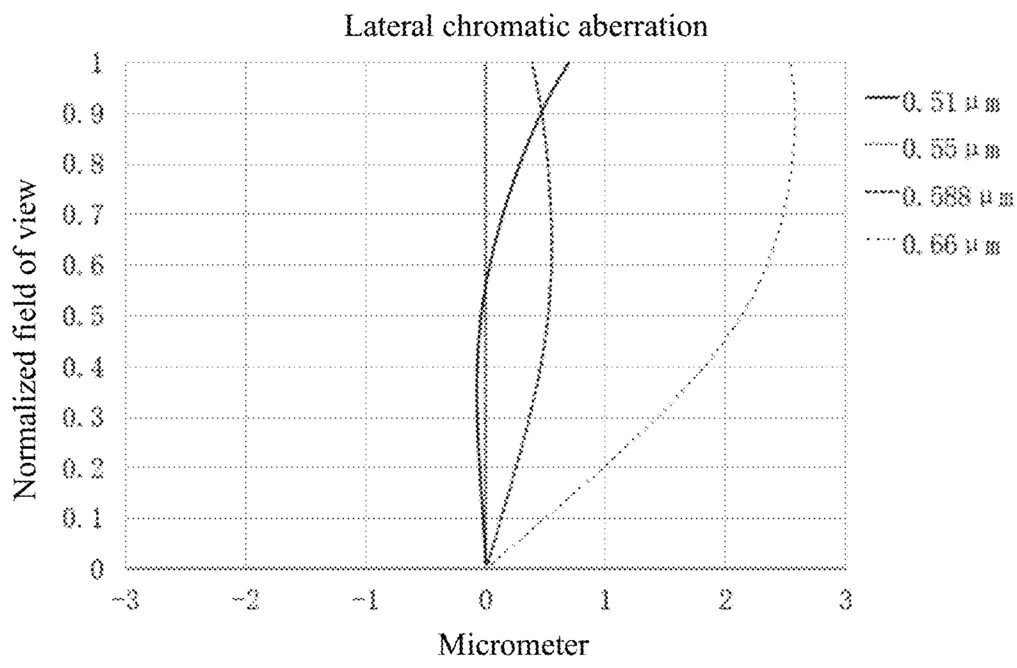
FIG. 9 is a graph of lateral chromatic aberrations of the optical lens according to Embodiment 2 of the present disclosure.
Figure 10:
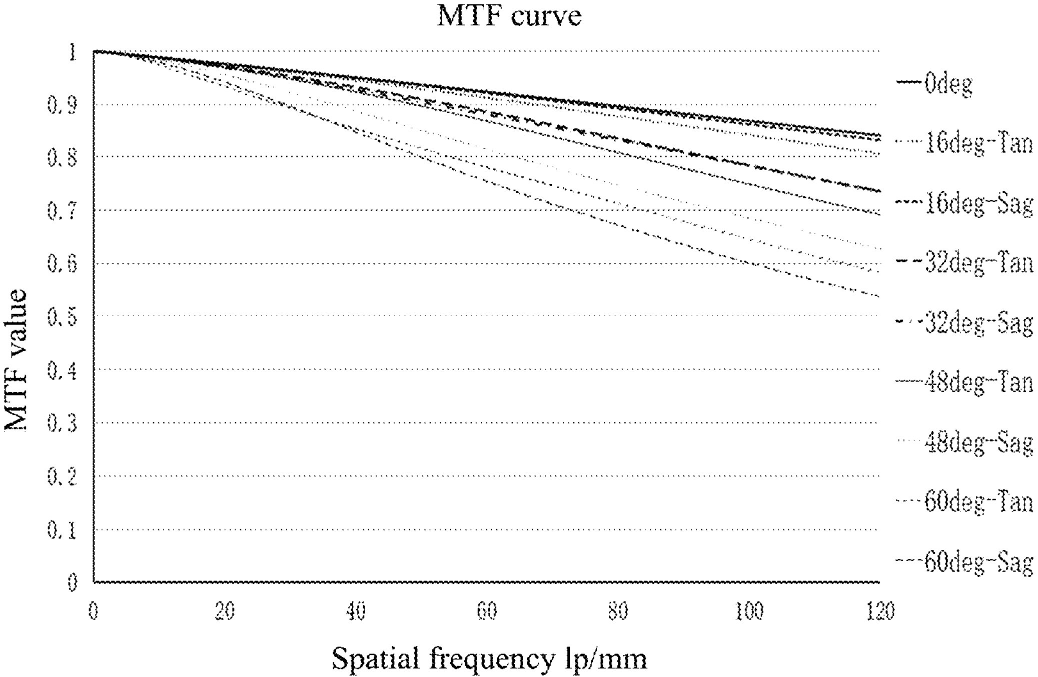
FIG. 10 is a graph of MTF of the optical lens according to Embodiment 2 of the present disclosure.

In the embodiment, the field curvature curves of the optical lens are shown in FIG. 7, the axial aberration curves of the optical lens are shown in FIG. 8, the lateral chromatic aberration curves of the optical lens are shown in FIG. 9, and the MTF curves of the optical lens are shown in FIG. 10.

The field curvature curves of Embodiment 2 are illustrated in FIG. 7, which represent curvature degrees of light at different wavelengths on a meridional plane and a sagittal plane. The horizontal axis represents an offset (unit: millimeter), and the vertical axis represents a half field of view (unit: degree (°)). It can be seen from the graph that the field curvatures of the meridional plane and the sagittal plane are within ±0.03 mm, which shows that the field curvatures of the optical lens are well corrected.

The axial aberration curves of Embodiment 2 are illustrated in FIG. 8, which represent aberrations on the optical axis at the imaging plane. The horizontal axis represents the axial aberration (unit: millimeter), and the vertical axis represents the normalized pupil radius. It can be seen from the graph that an offset of the axial aberration is within ±0.012 mm, which shows that optical lens can effectively correct the axial aberration thereof.

The lateral chromatic aberration curves of Embodiment 2 are illustrated in FIG. 9, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within ±3 μm, which shows that the optical lens can effectively correct the chromatic aberration of the edge field of view and the secondary spectrum of the entire imaging plane.

The MTF curves of Embodiment 2 are illustrated in FIG. 10, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-120) lp/mm, the MTF curves uniformly and smoothly decrease from the center to the edge field of view. A good imaging quality and a good detail resolution capability are all enabled at either a low frequency or a high frequency.

Embodiment 3

Figure 11:
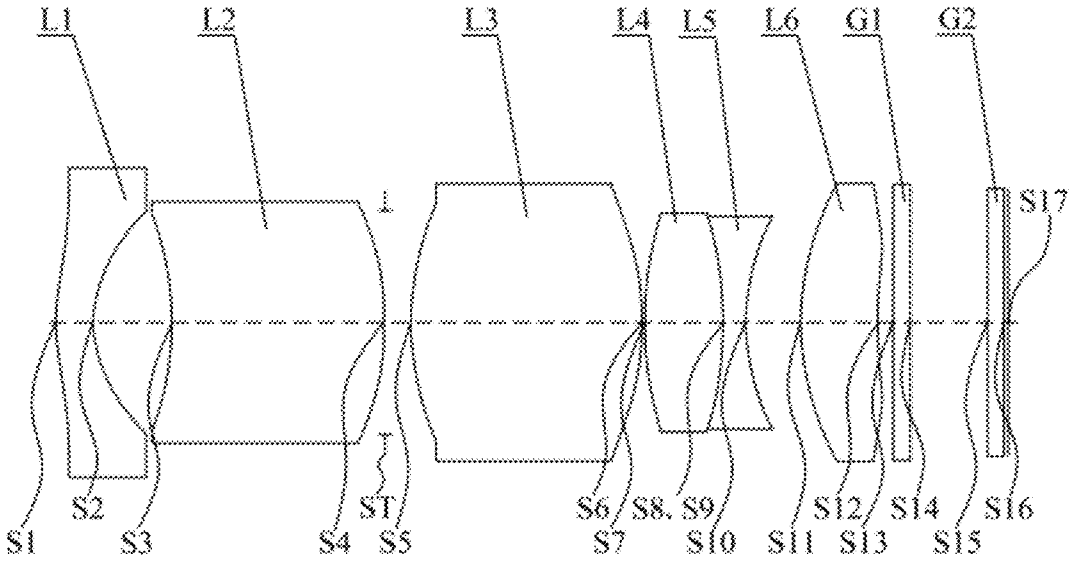
FIG. 11 is a schematic view illustrating a structure of an optical lens according to Embodiment 3 of the present disclosure.

Referring to FIG. 11, the structure of the optical lens provided in Embodiment 3 of the present disclosure is illustrated. From an object side to an imaging plane along an optical axis, the optical lens sequentially includes: a first lens L1, a second lens L2, a stop ST, a third lens L3, a fourth lens L4, a fifth lens L5, a sixth lens L6, a filter G1 and a protective glass G2.

The first lens L1 has a negative refractive power. The object side surface S1 of the first lens L1 is convex, and the image side surface S2 of the first lens is concave. The second lens L2 has a positive refractive power. The object side surface S3 of the second lens L2 is concave, and the image side surface S4 of the second lens L2 is convex. Then is the stop ST. The third lens L3 has a positive refractive power. Both the object side surface S5 and the image side surface S6 of the third lens L3 are convex. The fourth lens L4 has a positive refractive power. Both the object side surface S7 and the image side surface S8 of the fourth lens L4 are convex. The fifth lens L5 has a negative refractive power. Both the object side surface S9 and the image side surface S10 of the fifth lens L5 are concave. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 3 of the present disclosure are shown in Table 3-1.

TABLE 3-1

| Surface No. | | Surface type | Radius of curvature R (mm) | Thickness D/ Distance L(mm) | Refractive index Nd | Abbe number Vd |
|---|---|---|---|---|---|---|
| | Object plane | plane | Infinity | Infinity | | |
| S1 | First lens | Aspheric surface | 7.04 | 1.12 | 1.81 | 40.73 |
| S2 | | Aspheric surface | 3.11 | 2.40 | | |
| S3 | Second lens | Spherical surface | −9.68 | 6.50 | 1.83 | 37.23 |
| S4 | | Spherical surface | −8.81 | 0.02 | | |
| ST | Stop | plane | Infinity | 0.83 | | |
| S5 | Third lens | Spherical surface | 8.92 | 7.00 | 1.50 | 81.52 |
| S6 | | Spherical surface | −8.47 | 0.12 | | |
| S7 | Fourth lens | Spherical surface | 11.51 | 2.37 | 1.67 | 54.66 |
| S8/S9 | Fifth lens | Spherical surface | −11.21 | 0.70 | 1.81 | 25.48 |
| S10 | | Spherical surface | 7.07 | 1.69 | | |
| S11 | Sixth lens | Aspheric surface | 7.69 | 2.39 | 1.59 | 68.62 |
| S12 | | Aspheric surface | 57.04 | 0.41 | | |
| S13 | Filter | Plane | Infinity | 0.50 | 1.52 | 64.20 |
| S14 | | Plane | Infinity | 2.38 | | |
| S15 | Protective | Plane | Infinity | 0.50 | 1.52 | 64.20 |
| S16 | glass | Plane | Infinity | 0.11 | | |
| S17 | Imaging plane | Plane | Infinity | | | |

The parameters of surfaces of the aspheric lenses in the optical lens provided in Embodiment 3 of the present disclosure are shown in Table 3-2.

TABLE 3-2

| Surface No. | K | A | B | C | D | E | F |
|---|---|---|---|---|---|---|---|
| S1 | −1.43 | 0.00E+00 | −5.43E−03 | 2.45E−04 | −5.40E−06 | 1.85E−08 | 8.79E−10 |
| S2 | −3.29 | 0.00E+00 | 3.13E−03 | −3.94E−04 | 5.64E−05 | −2.87E−06 | 6.39E−08 |
| S11 | −2.21 | 0.00E+00 | 2.57E−04 | −1.84E−05 | 2.51E−06 | −1.31E−07 | 2.67E−09 |
| S12 | −3.99 | 0.00E+00 | −3.87E−04 | 1.77E−05 | −1.15E−08 | −1.36E−08 | 4.57E−10 |

Figure 12:
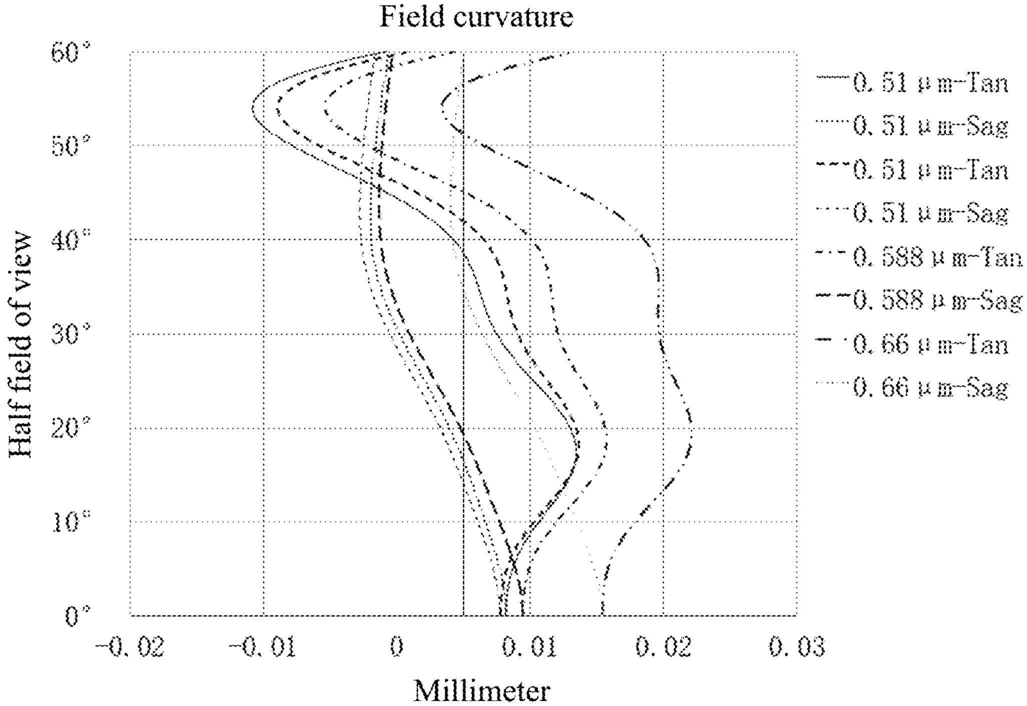
FIG. 12 is a graph of field curvatures of the optical lens according to Embodiment 3 of the present disclosure.
Figure 13:
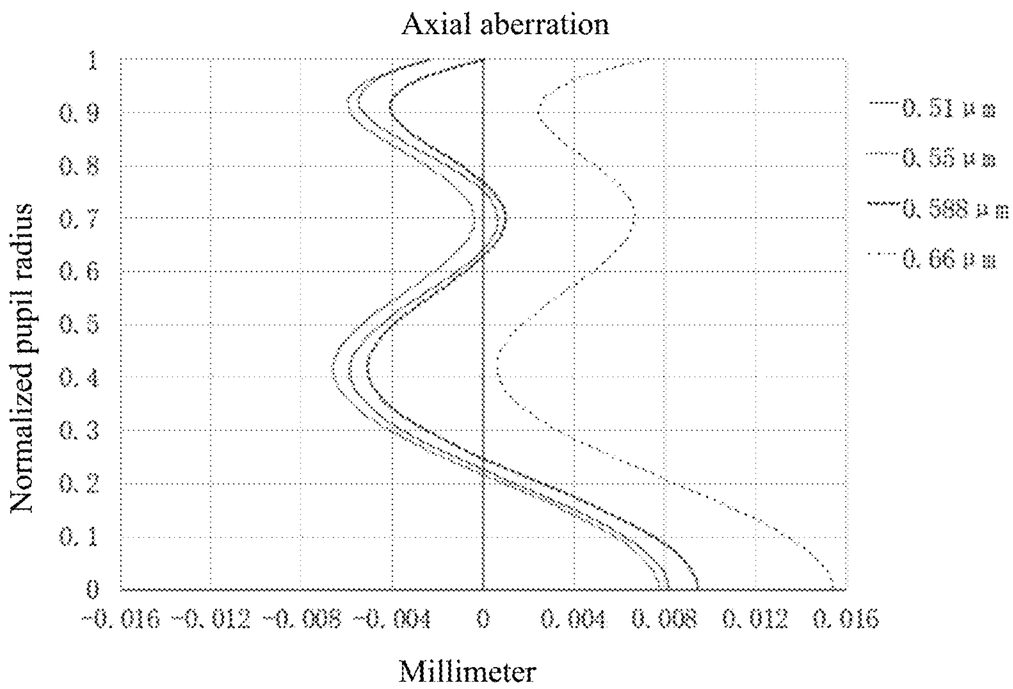
FIG. 13 is a graph of axial aberrations of the optical lens according to Embodiment 3 of the present disclosure.
Figure 14:
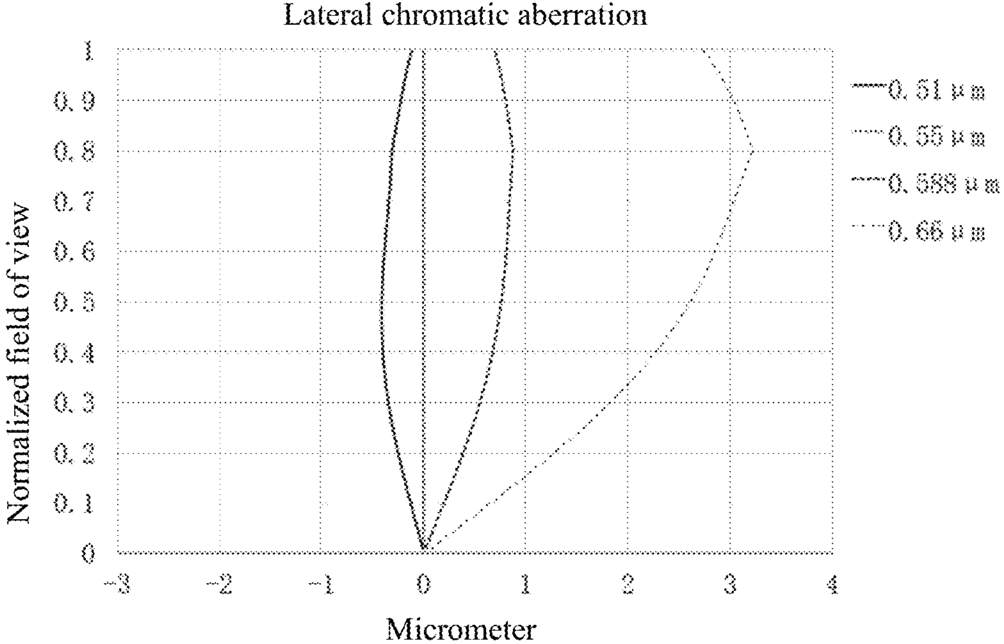
FIG. 14 is a graph of lateral chromatic aberrations of the optical lens according to Embodiment 3 of the present disclosure.
Figure 15:
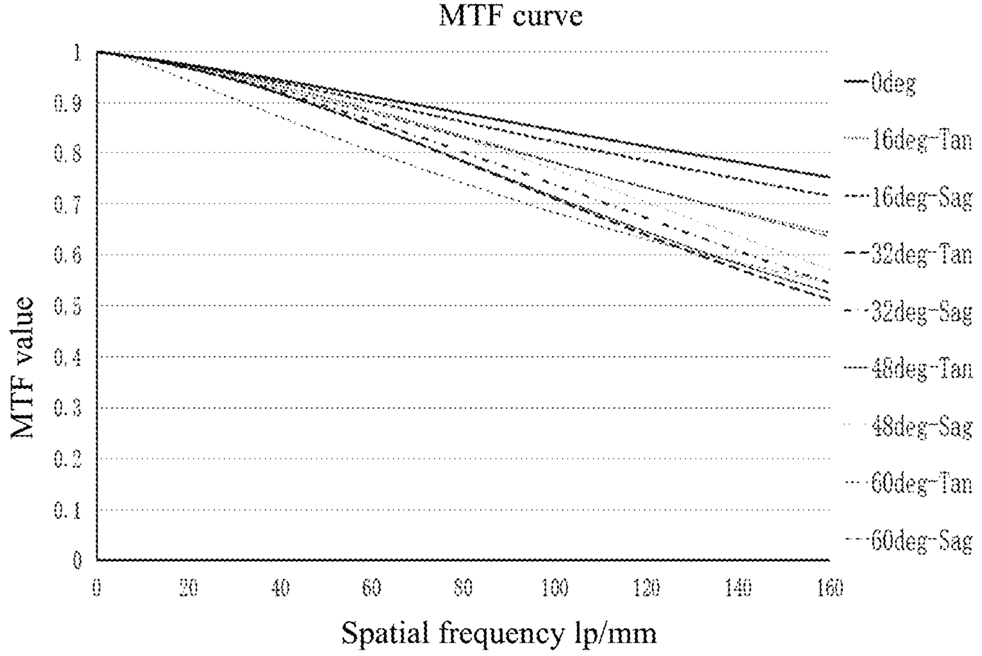
FIG. 15 is a graph of MTF of the optical lens according to Embodiment 3 of the present disclosure.

In the embodiment, the field curvature curves of the optical lens are shown in FIG. 12, the axial aberration curves of the optical lens are shown in FIG. 13, the lateral chromatic aberration curves of the optical lens are shown in FIG. 14, and the MTF curves of the optical lens are shown in FIG. 15.

The field curvature curves of Embodiment 3 are illustrated in FIG. 12, which represent curvature degrees of light at different wavelengths on a meridional plane and a sagittal plane. The horizontal axis represents an offset (unit: millimeter), and the vertical axis represents a half field of view (unit: degree (°)). It can be seen from the graph that the field curvatures of the meridional plane and the sagittal plane are within ±0.03 mm, which shows that the field curvatures of the optical lens are well corrected.

The axial aberration curves of Embodiment 3 are illustrated in FIG. 13, which represent aberrations on the optical axis at the imaging plane. The horizontal axis represents the axial aberration (unit: millimeter), and the vertical axis represents the normalized pupil radius. It can be seen from the graph that an offset of the axial aberration is within ±0.016 mm, which shows that optical lens can effectively correct the axial aberration thereof.

The lateral chromatic aberration curves of Embodiment 3 are illustrated in FIG. 14, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within ±4 μm, which shows that the optical lens can effectively correct the chromatic aberration of the edge field of view and the secondary spectrum of the entire imaging plane.

The MTF curves of Embodiment 3 are illustrated in FIG. 15, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-160) lp/mm, the MTF curves uniformly and smoothly decrease from the center to the edge field of view. A good imaging quality and a good detail resolution capability are all enabled at either a low frequency or a high frequency.

Embodiment 4

Figure 16:
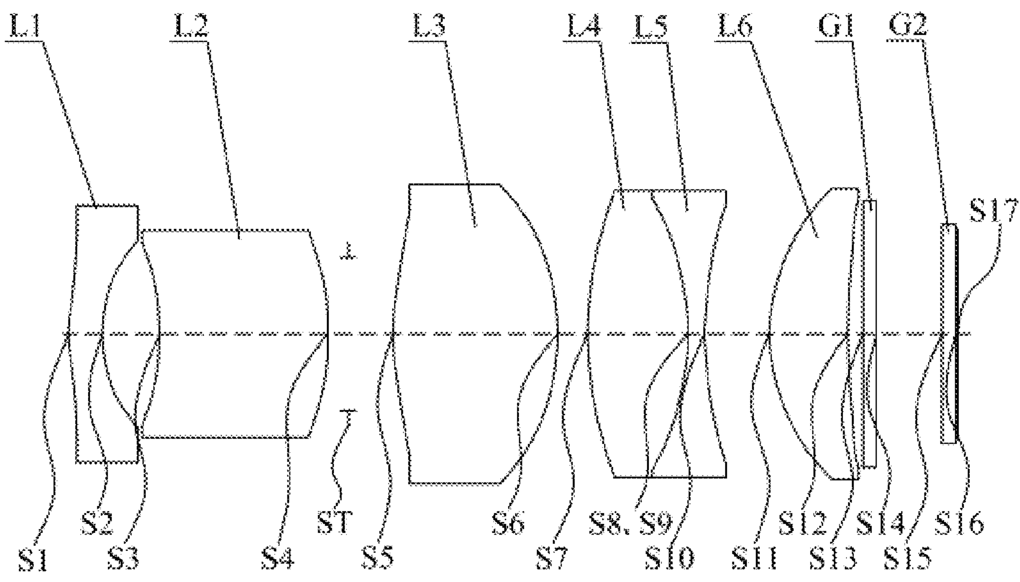
FIG. 16 is a schematic view illustrating a structure of an optical lens according to Embodiment 4 of the present disclosure.

Referring to FIG. 16, the structure of the optical lens provided in Embodiment 4 of the present disclosure is illustrated. From an object side to an imaging plane along an optical axis, the optical lens sequentially includes: a first lens L1, a second lens L2, a stop ST, a third lens L3, a fourth lens L4, a fifth lens L5, a sixth lens L6, a filter G1 and a protective glass G2.

The first lens L1 has a negative refractive power. The object side surface S1 of the first lens L1 is convex, and the image side surface S2 of the first lens is concave. The second lens L2 has a positive refractive power. The object side surface S3 of the second lens L2 is concave, and the image side surface S4 of the second lens L2 is convex. Then is the stop ST. The third lens L3 has a positive refractive power. Both the object side surface S5 and the image side surface S6 of the third lens L3 are convex. The fourth lens L4 has a positive refractive power. Both the object side surface S7 and the image side surface S8 of the fourth lens L4 are convex. The fifth lens L5 has a negative refractive power. Both the object side surface S9 and the image side surface S10 of the fifth lens L5 are concave. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 4 of the present disclosure are shown in Table 4-1.

TABLE 4-1

| Surface No. | | Surface type | Radius of curvature R (mm) | Thickness D/ Distance L(mm) | Refractive index Nd | Abbe number Vd |
|---|---|---|---|---|---|---|
| | Object plane | plane | Infinity | Infinity | | |
| S1 | First lens | Aspheric surface | 7.47 | 1.01 | 1.81 | 40.73 |
| S2 | | Aspheric surface | 3.21 | 2.45 | | |
| S3 | Second lens | Spherical surface | −9.64 | 6.40 | 2.00 | 28.32 |
| S4 | | Spherical surface | −10.55 | 0.76 | | |
| ST | Stop | plane | Infinity | 1.75 | | |
| S5 | Third lens | Spherical surface | 13.63 | 6.22 | 1.50 | 81.52 |
| S6 | | Spherical surface | −9.20 | 1.18 | | |
| S7 | Fourth lens Fifth lens | Spherical surface | 15.56 | 3.77 | 1.62 | 63.41 |
| S8/S9 | | Spherical surface | −10.68 | 0.67 | 1.85 | 23.79 |
| S10 | | Spherical surface | 16.38 | 2.43 | | |
| S11 | Sixth lens | Aspheric surface | 6.47 | 3.06 | 1.59 | 68.62 |
| S12 | | Aspheric surface | 22.18 | 0.52 | | |

TABLE 4-1-continued

| Surface No. | | Surface type | Radius of curvature R (mm) | Thickness D/ Distance L(mm) | Refractive index Nd | Abbe number Vd |
|---|---|---|---|---|---|---|
| S13 | Filter | Plane | Infinity | 0.50 | 1.52 | 64.20 |
| S14 | | Plane | Infinity | 2.50 | | |
| S15 | Protective | Plane | Infinity | 0.50 | 1.52 | 64.20 |
| S16 | glass | Plane | Infinity | 0.08 | | |
| S17 | Imaging plane | Plane | Infinity | | | |

The parameters of surfaces of the aspheric lenses in the optical lens provided in Embodiment 4 of the present disclosure are shown in Table 4-2.

TABLE 4-2

| Surface No. | K | A | B | C | D | E | F |
|---|---|---|---|---|---|---|---|
| S1 | −0.58 | 0.00E+00 | −6.67E−03 | 3.82E−04 | −1.38E−05 | 2.86E−07 | −2.57E−09 |
| S2 | −2.90 | 0.00E+00 | −4.56E−04 | 8.58E−05 | 1.20E−05 | −9.63E−07 | 2.98E−08 |
| S11 | −30.16 | 0.00E+00 | 1.10E−03 | −9.99E−05 | 5.57E−06 | −2.07E−07 | 3.06E−09 |
| S12 | −4.18 | 0.00E+00 | −8.33E−04 | 8.97E−06 | −1.43E−07 | −3.82E−09 | 4.53E−11 |

Figure 17:
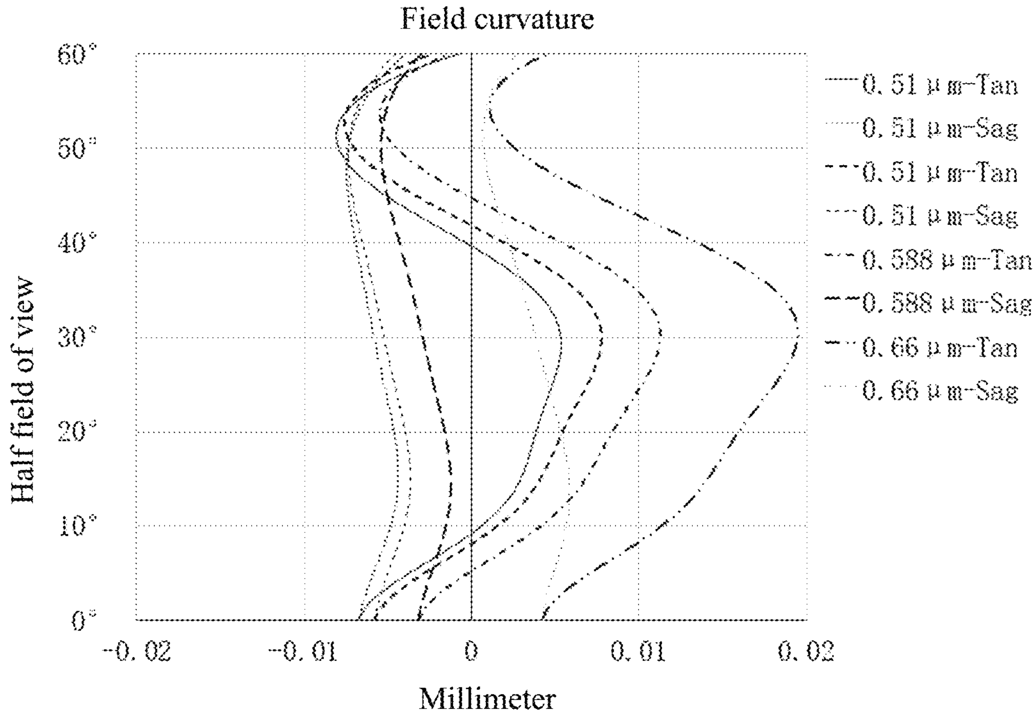
FIG. 17 is a graph of field curvatures of the optical lens according to Embodiment 4 of the present disclosure.
Figure 18:
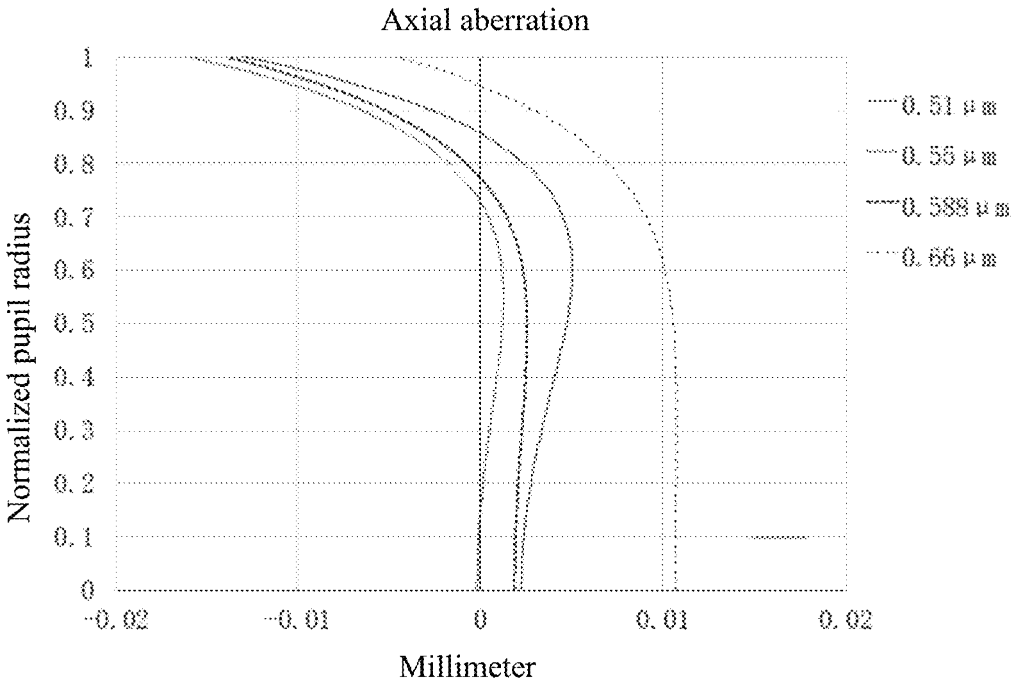
FIG. 18 is a graph of axial aberrations of the optical lens according to Embodiment 4 of the present disclosure.
Figure 19:
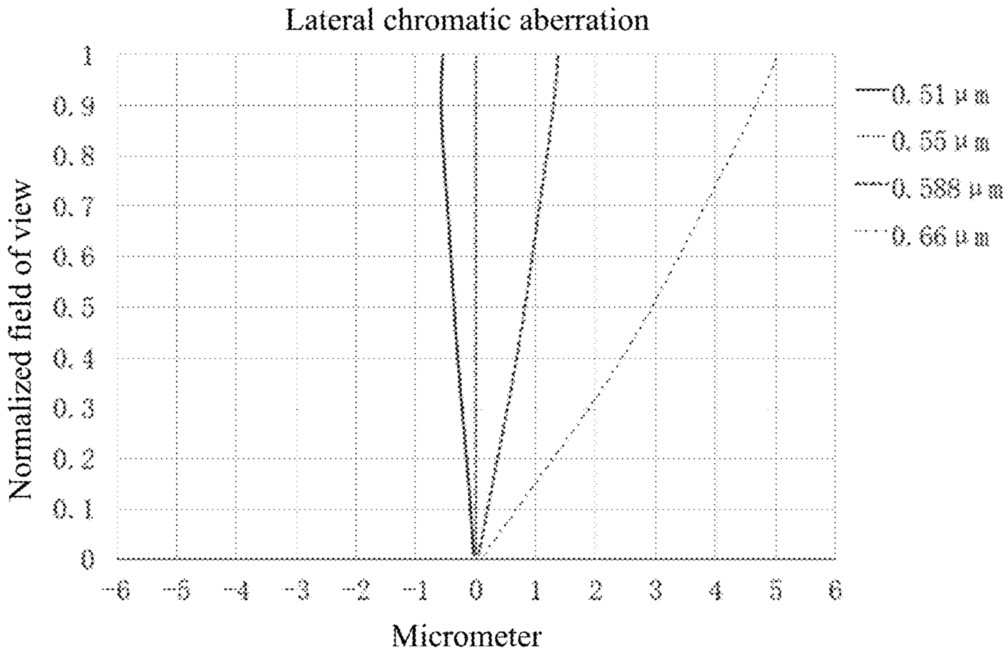
FIG. 19 is a graph of lateral chromatic aberrations of the optical lens according to Embodiment 4 of the present disclosure.
Figure 20:
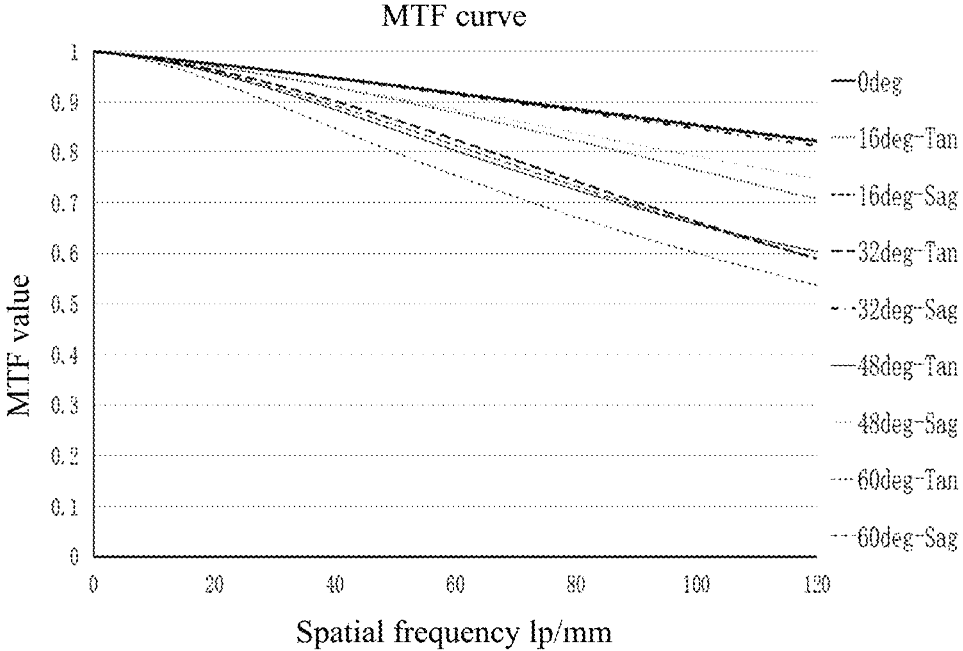
FIG. 20 is a graph of MTF of the optical lens according to Embodiment 4 of the present disclosure.

In the embodiment, the field curvature curves of the optical lens are shown in FIG. 17, the axial aberrations curves of the optical lens are shown in FIG. 18, the lateral chromatic aberration curves of the optical lens are shown in FIG. 19, and the MTF curves of the optical lens are shown in FIG. 20.

The field curvature curves of Embodiment 4 are illustrated in FIG. 17, which represent curvature degrees of light at different wavelengths on a meridional plane and a sagittal plane. The horizontal axis represents an offset (unit: millimeter), and the vertical axis represents a half field of view (unit: degree (°)). It can be seen from the graph that the field curvatures of the meridional plane and the sagittal plane are within ±0.02 mm, which shows that the field curvatures of the optical lens are well corrected.

The axial aberration curves of Embodiment 4 are illustrated in FIG. 18, which represent aberrations on the optical axis at the imaging plane. The horizontal axis represents the axial aberration (unit: millimeter), and the vertical axis represents the normalized pupil radius. It can be seen from the graph that an offset of the axial aberration is within ±0.02 mm, which shows that optical lens can effectively correct the axial aberration thereof.

The lateral chromatic aberration curves of Embodiment 4 are illustrated in FIG. 19, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within ±6 μm, which shows that the optical lens can effectively correct the chromatic aberration of the edge field of view and the secondary spectrum of the entire imaging plane.

The MTF curves of Embodiment 4 are illustrated in FIG. 20, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-120) lp/mm, the MTF curves uniformly and smoothly decrease from the center to the edge field of view. A good imaging quality and a good detail resolution capability are all enabled at either a low frequency or a high frequency.

Embodiment 5

Figure 21:
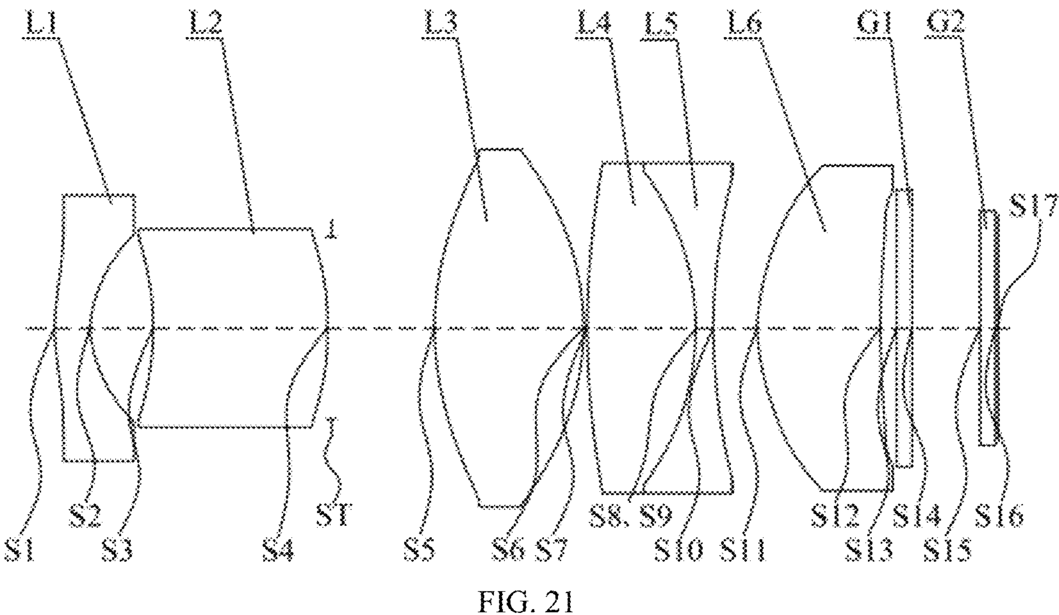
FIG. 21 is a schematic view illustrating a structure of an optical lens according to Embodiment 5 of the present disclosure.

Referring to FIG. 21, the structure of the optical lens provided in Embodiment 5 of the present disclosure is illustrated. From an object side to an imaging plane along an optical axis, the optical lens sequentially includes: a first lens L1, a second lens L2, a stop ST, a third lens L3, a fourth lens L4, a fifth lens L5, a sixth lens L6, a filter G1 and a protective glass G2.

The first lens L1 has a negative refractive power. The object side surface S1 of the first lens L1 is convex, and the image side surface S2 of the first lens is concave. The second lens L2 has a positive refractive power. The object side surface S3 of the second lens L2 is concave, and the image side surface S4 of the second lens L2 is convex. Then is the stop ST. The third lens L3 has a positive refractive power. Both the object side surface S5 and the image side surface S6 of the third lens L3 are convex. The fourth lens L4 has a positive refractive power. Both the object side surface S7 and the image side surface S8 of the fourth lens L4 are convex. The fifth lens L5 has a negative refractive power. Both the object side surface S9 and the image side surface S10 of the fifth lens L5 are concave. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 5 of the present disclosure are shown in Table 5-1.

TABLE 5-1

| Surface No. | | Surface type | Radius of curvature R (mm) | Thickness D/ Distance L(mm) | Refractive index Nd | Abbe number Vd |
|---|---|---|---|---|---|---|
| | Object plane | plane | Infinity | Infinity | | |
| S1 | First lens | Aspheric surface | 8.29 | 1.28 | 1.81 | 40.73 |
| S2 | | Aspheric surface | 3.25 | 2.23 | | |
| S3 | Second lens | Spherical surface | −11.17 | 6.28 | 2.00 | 28.32 |
| S4 | | Spherical surface | −10.66 | 0.13 | | |
| ST | Stop | plane | Infinity | 3.72 | | |
| S5 | Third lens | Spherical surface | 10.62 | 5.36 | 1.50 | 81.52 |
| S6 | | Spherical surface | −9.27 | 0.12 | | |
| S7 | Fourth lens Fifth lens | Spherical surface | 31.73 | 3.88 | 1.62 | 63.41 |
| S8/S9 | | Spherical surface | −9.29 | 0.00 | 1.85 | 23.79 |
| S10 | | Spherical surface | −9.29 | 0.67 | | |
| S11 | Sixth lens | Aspheric surface | 23.99 | 1.57 | 1.59 | 68.62 |
| S12 | | Aspheric surface | 7.47 | 4.47 | | |
| S13 | Filter | Plane | 28.45 | 0.52 | 1.52 | 64.20 |
| S14 | | Plane | Infinity | 0.50 | | |
| S15 | Protective | Plane | Infinity | 2.50 | 1.52 | 64.20 |
| S16 | glass | Plane | Infinity | 0.50 | | |
| S17 | Imaging plane | Plane | Infinity | 0.10 | | |

The parameters of surfaces of the aspheric lenses in the optical lens provided in Embodiment 5 of the present disclosure are shown in Table 5-2.

TABLE 5-2

| Surface No. | K | A | B | C | D | E | F |
|---|---|---|---|---|---|---|---|
| S1 | −1.43 | 0.00E+00 | −4.37E−03 | 1.73E−04 | −3.18E−06 | −3.94E−09 | 7.58E−10 |
| S2 | −3.34 | 0.00E+00 | 3.52E−03 | −4.51E−04 | 5.74E−05 | −3.24E−06 | 7.88E−08 |
| S11 | −2.20 | 0.00E+00 | 2.41E−05 | −5.16E−08 | −2.31E−08 | −3.13E−10 | 2.58E−12 |
| S12 | −2.97 | 0.00E+00 | −4.66E−04 | 1.14E−05 | −2.50E−07 | 3.19E−09 | −2.71E−11 |

Figure 22:
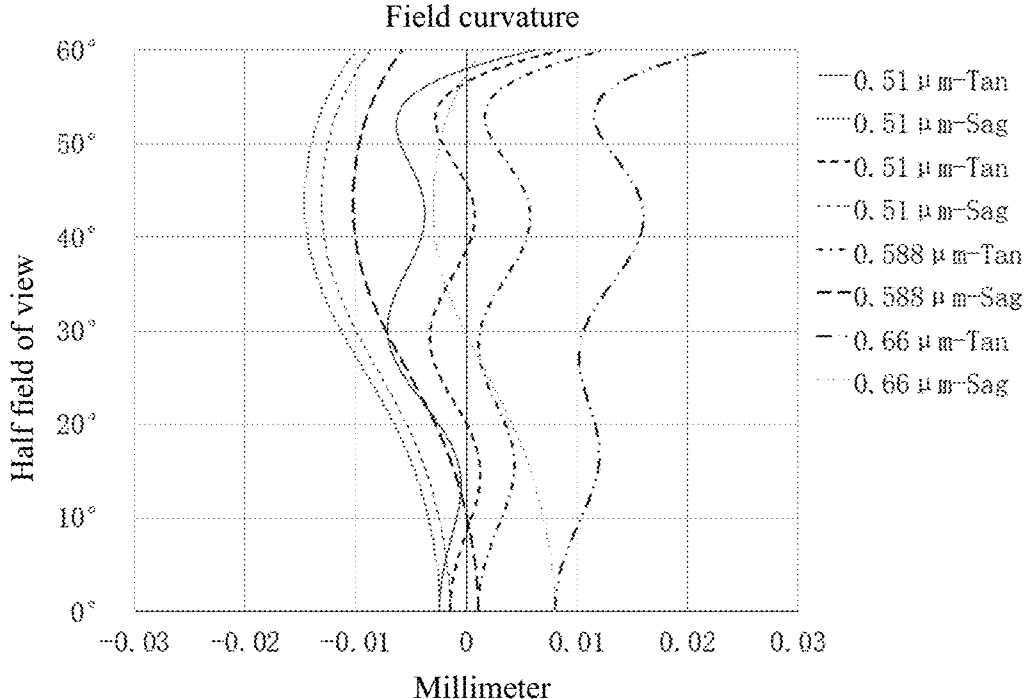
FIG. 22 is a graph of field curvatures of the optical lens according to Embodiment 5 of the present disclosure.
Figure 23:
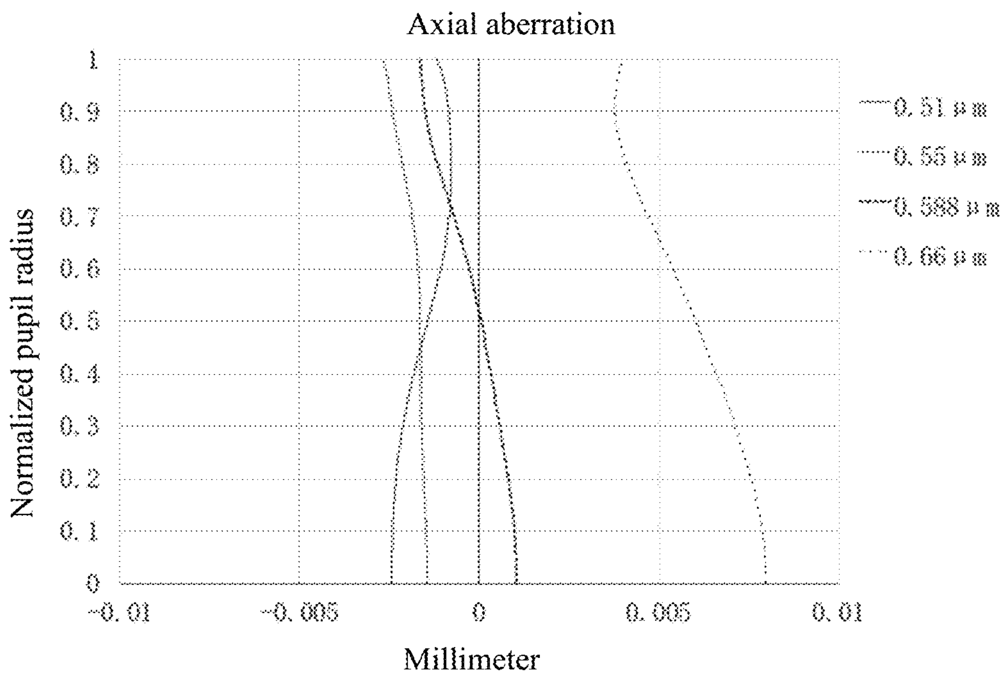
FIG. 23 is a graph of axial aberrations of the optical lens according to Embodiment 5 of the present disclosure.
Figure 24:
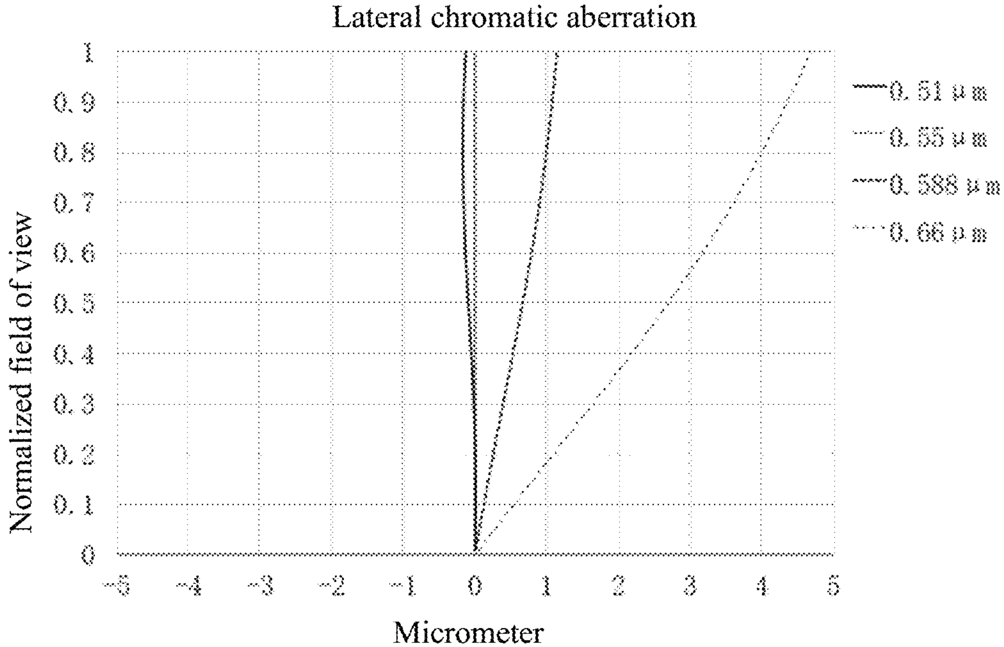
FIG. 24 is a graph of lateral chromatic aberrations of the optical lens according to Embodiment 5 of the present disclosure.
Figure 25:
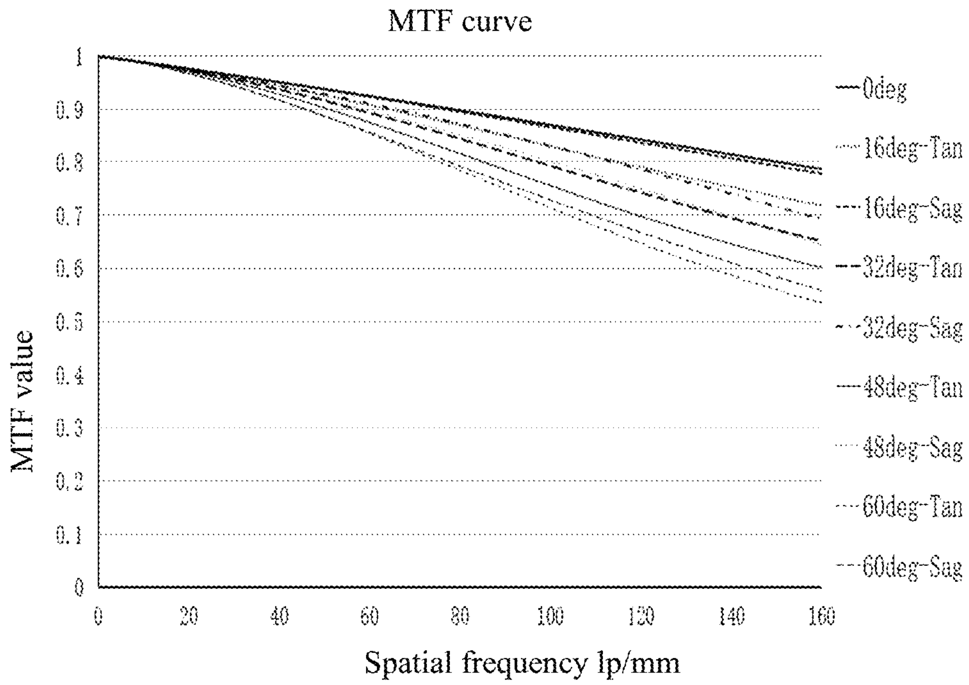
FIG. 25 is a graph of MTF of the optical lens according to Embodiment 5 of the present disclosure.

In the embodiment, the field curvature curves of the optical lens are shown in FIG. 22, the axial aberration curves of the optical lens are shown in FIG. 23, the lateral chromatic aberration curves of the optical lens are shown in FIG. 24, and the MTF curves of the optical lens are shown in FIG. 25.

The field curvature curves of Embodiment 5 are illustrated in FIG. 22, which represent curvature degrees of light at different wavelengths on a meridional plane and a sagittal plane. The horizontal axis represents an offset (unit: millimeter), and the vertical axis represents a half field of view (unit: degree (°)). It can be seen from the graph that the field curvatures of the meridional plane and the sagittal plane are within ±0.03 mm, which shows that the field curvatures of the optical lens are well corrected.

The axial aberration curves of Embodiment 5 are illustrated in FIG. 23, which represent aberrations on the optical axis at the imaging plane. The horizontal axis represents the axial aberration (unit: millimeter), and the vertical axis represents the normalized pupil radius. It can be seen from the graph that an offset of the axial aberration is within ±0.01 mm, which shows that optical lens can effectively correct the axial aberration thereof.

The lateral chromatic aberration curves of Embodiment 5 are illustrated in FIG. 24, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within ±5 μm, which shows that the optical lens can effectively correct the chromatic aberration of the edge field of view and the secondary spectrum of the entire imaging plane.

The MTF curves of Embodiment 5 are illustrated in FIG. 25, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-160) lp/mm, the MTF curves uniformly and smoothly decrease from the center to the edge field of view. A good imaging quality and a good detail resolution capability are all enabled at either a low frequency or a high frequency.

Referring to Table 6, the optical characteristics of the above embodiments are illustrated, including the effective focal length f of the optical lens, the total track length TTL, the f-number FNO, the true image height IH, the field of view FOV, and values of the expressions corresponding to the embodiments.

TABLE 6

| Parameters & Expression | Embodiment 1 | Embodiment 2 | Embodiment 3 | Embodiment 4 | Embodiment 5 |
|---|---|---|---|---|---|
| f (mm) | 5.41 | 5.02 | 5.18 | 5.11 | 5.11 |
| TTL(mm) | 33.98 | 30.36 | 29.05 | 33.80 | 33.81 |
| FNO | 1.46 | 1.60 | 1.60 | 1.60 | 1.6 |
| IH (mm) | 8.06 | 8.06 | 8.06 | 8.06 | 8.06 |
| FOV(°) | 120 | 120 | 120 | 120 | 120 |
| CRA(°) | 3.97 | 8.33 | 9.93 | 2.01 | 1.43 |
| f/IH | 0.67 | 0.62 | 0.64 | 0.63 | 0.63 |
| ΣCT/TTL | 0.74 | 0.71 | 0.73 | 0.66 | 0.68 |
| HD1/D1 | 0.61 | 0.60 | 0.59 | 0.59 | 0.59 |
| f1/f | −1.43 | −1.39 | −1.52 | −1.52 | −1.46 |
| f2/f | 6.08 | 3.98 | 5.12 | 8.55 | 6.29 |
| f3/f | 2.25 | 2.13 | 1.94 | 2.37 | 2.13 |
| f4/f | 2.21 | 2.05 | 1.72 | 2.11 | 2.33 |
| f5/f | −1.21 | −1.22 | −1.01 | −1.46 | −1.52 |
| f6/f | 2.24 | 3.13 | 2.85 | 2.82 | 3.11 |
| R1/(R2 + CT1) | 1.53 | 1.76 | 1.66 | 1.77 | 1.83 |
| R3/R4 | 0.95 | 1.52 | 1.10 | 0.91 | 1.05 |
| R5/f3 | 0.90 | 1.10 | 0.89 | 1.13 | 0.97 |
| R7/R10 | 1.15 | 1.29 | 1.63 | 0.95 | 1.32 |
| (R11 + R12)/(R11 − R12) | −1.17 | −1.77 | −1.31 | −1.82 | −1.71 |
| CT2/TTL | 0.19 | 0.21 | 0.22 | 0.19 | 0.19 |
| CT3/TTL | 0.20 | 0.18 | 0.24 | 0.18 | 0.16 |

In summary, in the embodiments of the present disclosure, by reasonably matching lens shapes among the lenses and combining the refractive power of various lenses, a large aperture, a large field of view and a high resolution of the optical lens are enabled.

The foregoing embodiments only illustrate several implementations of the present disclosure, and their descriptions are relatively specific and detailed, but they cannot be construed as limiting the scope of the present disclosure. It is notable for those skilled in the art that, several variations and modifications may be made by those skilled in the art without departing from the concept of the present disclosure, and all of them should fall within the protection scope of the present disclosure. Accordingly, the protection scope of the present disclosure is subject to the appended claims.

What is claimed is:

1. An optical lens, comprising a total of six lenses, wherein from an object side to an imaging plane along an optical axis of the optical lens, the optical lens sequentially comprises:

a first lens with a negative focal power, an object side surface of the first lens being convex, and an image side surface of the first lens being concave;

a second lens with a positive focal power, an object side surface of the second lens being concave, and an image side surface of the second lens being convex;

a stop;

a third lens with a positive focal power, both an object side surface and an image side surface of the third lens being convex;

a fourth lens with a positive focal power, both an object side surface and an image side surface of the fourth lens being convex;

a fifth lens with a negative focal power, both an object side surface and an image side surface of the fifth lens being concave; and a sixth lens with a positive focal power, an object side surface of the sixth lens being convex, and an image side surface of the sixth lens being concave;

wherein the fourth lens and the fifth lens are cemented to form a cemented lens;

an effective focal length f of the optical lens and a true image height IH corresponding to a maximum field of view meets an expression: $0.6<f/IH<0.7$; and an effective aperture HD1 of the object side surface of the first lens corresponding to a half field of view of the optical lens and an effective aperture D1 of the object side surface of the first lens meet an expression: $0.55<HD1/D1<0.65$.

2. The optical lens of claim 1, wherein the effective focal length f of the optical lens meets an expression: 5.0 mm<f<5.5 mm.

3. The optical lens of claim 1, wherein an f-number of the optical lens meets an expression: $1.4<FNO\leq 1.6$.

4. The optical lens of claim 1, wherein a chief ray angle CRA on the imaging plane at a full field of view of the optical lens meets an expression: $1°<CRA<10°$.

5. The optical lens of claim 1, wherein the effective focal length f of the optical lens and a focal length f1 of the first lens meet an expression: $-1.55<f1/f<-1.35$; and a radius of curvature R1 of the object side surface of the first lens, a radius of curvature R2 of the image side surface of the first lens, and a center thickness CT1 of the first lens meet an expression: $1.5<R1/(R2+CT1)<1.9$.

6. The optical lens of claim 1, wherein the effective focal length f of the optical lens and a focal length f2 of the second lens meet an expression: $3.5<f2/f<9.0$;

a radius of curvature R3 of the object side surface and a radius of curvature R4 of the image side surface of the second lens meet an expression: $0.90<R3/R4<1.95$; and a center thickness CT2 of the second lens and a total track length TTL of the optical lens meet an expression: $0.19\leq CT2/TTL\leq 0.22$.

7. The optical lens of claim 1, wherein the effective focal length f of the optical lens and a focal length f3 of the third lens meet an expression: $1.5<f3/f<2.5$;

a radius of curvature R5 of the object side surface of the third lens and the focal length f3 of the third lens meet an expression: $0.85<R5/f3<1.15$; and a center thickness CT3 of the third lens and a total track length TTL of the optical lens meet an expression: $0.16 \leq CT3/TTL \leq 0.24$.

8. The optical lens of claim 1, wherein the effective focal length f of the optical lens and a focal length f4 of the fourth lens meet an expression: $1.5<f4/f<2.5$.

9. The optical lens of claim 1, wherein the effective focal length f of the optical lens and a focal length f5 of the fifth lens meet an expression: $-1.6<f5/f<-1.0$; and a radius of curvature R7 of the object side surface of the fourth lens and a radius of curvature R10 of the image side surface of the fifth lens meet an expression: $0.90<R7/R10<1.65$.

10. The optical lens of claim 1, wherein the effective focal length f of the optical lens and a focal length f6 of the sixth lens meet an expression: $2.0<f6/f<3.5$; and a radius of curvature R11 of the object side surface and a radius of curvature R12 of the image side surface of the sixth lens meet an expression: $-1.9<(R11+R12)/(R11-R12)<-1.1$.

* * * * *